(12) United States Patent
Noddings

(10) Patent No.: US 9,245,455 B2
(45) Date of Patent: Jan. 26, 2016

(54) MUSIC WORMHOLE, A MUSIC EDUCATION AND ENTERTAINMENT SYSTEM

(71) Applicant: Paul Noddings, Santa Cruz, CA (US)

(72) Inventor: Paul Noddings, Santa Cruz, CA (US)

(*) Notice: Subject to any disclaimer, the term of this patent is extended or adjusted under 35 U.S.C. 154(b) by 205 days.

(21) Appl. No.: 14/043,166

(22) Filed: Oct. 1, 2013

(65) Prior Publication Data

US 2014/0026738 A1 Jan. 30, 2014

Related U.S. Application Data

(63) Continuation of application No. 13/098,258, filed on Apr. 29, 2011, now abandoned.

(51) Int. Cl.
*G09B 15/00* (2006.01)
*G09B 15/06* (2006.01)
*G09B 15/02* (2006.01)

(52) U.S. Cl.
CPC ............ *G09B 15/003* (2013.01); *G09B 15/023* (2013.01); *G09B 15/026* (2013.01); *G09B 15/06* (2013.01)

(58) Field of Classification Search
USPC .............................................. 84/485 R, 470 R
See application file for complete search history.

(56) References Cited

U.S. PATENT DOCUMENTS

| 3,960,046 | A | * | 6/1976 | Choong | 84/471 R |
| 4,503,748 | A | * | 3/1985 | Barber, Jr. | 84/474 |
| 4,716,806 | A | * | 1/1988 | Forrest | 84/474 |
| 4,887,507 | A | * | 12/1989 | Shaw | 84/474 |
| 5,288,234 | A | * | 2/1994 | Hamzi | 434/404 |
| 6,031,172 | A | * | 2/2000 | Papadopoulos | 84/470 R |
| 6,841,724 | B2 | * | 1/2005 | George | 84/477 R |
| 7,141,731 | B2 | * | 11/2006 | Vallery | 84/474 |
| 7,184,701 | B2 | * | 2/2007 | Heslip | 434/307 R |
| 8,378,195 | B2 | * | 2/2013 | Willoughby | 84/477 R |
| 2011/0167987 | A1 | * | 7/2011 | Lozano, Jr. | 84/471 R |
| 2012/0160079 | A1 | * | 6/2012 | Little et al. | 84/613 |

* cited by examiner

*Primary Examiner* — Christopher Uhlir

(57) ABSTRACT

System showing the finger positions on multiple different musical instruments for all the chords in all the keys of the Major Scale, color coordinated to western music's twelve point chromatic scale, showing key signature, character, chromatic scale degree and other relevant musical information.

2 Claims, 40 Drawing Sheets

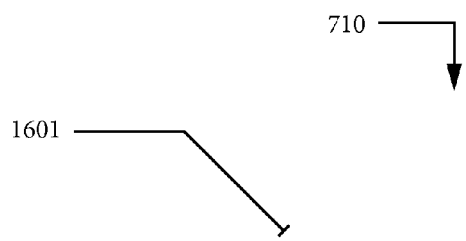
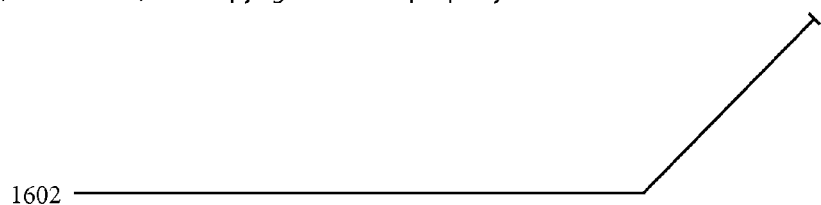
*Fig. 16*

1702

1801

Your Wormhole shows the finger positions on the Piano for all the chords in all the keys of the Major Scale.
A good way to use your Wormhole is to play the Major Scale in the key of C, then G, D and F. Start by playing only the Major Chords of the Major Scale using the popular chord progression I, IV, V, ( I ) with four beats per chord and then play all the chords of the Major Scale in all the keys: I, ii, iii, IV, V, vi, vii°, ( I ). The Major Scales is a series of seven "intervals between notes" that is applied to the 12 note chromatic scale to create a seven note scale called the Major Scale (the intervals of the Major Scale are wwhwwwh, w = whole step, h = half step, w=hx2, 5(w)+2(h)=12(h)= the 12 notes of the chromatic scale). Often, the first note of any scale is played again at the end of the scale, making an eighth note (shown in brackets to indicate "repeat from the beginning"). The Major Scale is the most popular scale and most songs use chords from only one key of the Major Scale. The Major Scale can start on any of the twelve notes of the chromatic scale. The first note of the scale gives the scale it name (or KEY) and is the tonal center of the scale. The seven degrees of the major scales are represented by Roman Numerals, with uppercase Roman Numerals representing Major Chords, lower case Roman Numerals representing Minor Chords and the degree sign representing the one Diminished Chord that is found in each Major Scale.
By playing the Major Scale in any key, you take one loop around the rainbow colored spiral diagram:

3201 — The lowest frequency that 3102
humans can hear is approximately 20(Hz)
vibrations per second and our highest audible frequency is
approximately 20,000(Hz) vibrations per second. This large range is
organized into ten octaves. Within each octave, Western Music is organized into
twelve notes (called the chromatic scale with the note names C, C#/Db, D, D#/Eb, E, F,
F#/Gb, G, G#/Ab, A, A#/Bb, & B) where the sound frequency (Hz) of each note doubles as it
advances up the octaves. Each color on this disc represents one of the twelve notes of the Chromatic
Scale and the spiral represents the ten octaves. To make music more colorful, three (triad) or more notes
are played at once, called chords. The most common intervals between the notes of a chord are shown by the
pie charts below along with the intervals of Major scale. Follow the spiral down, through the wormhole, into the
musical universe of the Major Scale. ☺

Your Wormhole shows the finger positions on the Ukulele for all the chords in all the keys of the Major Scale. A good way to use your Wormhole is to play the Major Scale in the key of C, then G, D and F. Start by playing only the Major Chords of the Major Scale using the popular chord progression I, IV, V, ( I ) with four beats per chord and then play all the chords of the Major Scale in all the keys: I, ii, iii, IV, V, vi, vii°, ( I ). The Major Scales is a series of seven "intervals between notes" that is applied to the 12 note chromatic scale to create a seven note scale called the Major Scale (the intervals of the Major Scale are wwhwwwh, w = whole step, h = half step, w=hx2, 5(w)+2(h)=12(h)= the 12 notes of the chromatic scale). Often, the first note of any scale is played again at the end of the scale, making an eighth note (shown in brackets to indicate "repeat from the beginning"). The Major Scale is the most popular scale and most songs use chords from only one key of the Major Scale. The Major Scale can start on any of the twelve notes of the chromatic scale. The first note of the scale gives the scale it name (or KEY) and is the tonal center of the scale. The seven degrees of the major scales are represented by Roman Numerals, with uppercase Roman Numerals representing Major Chords, lower case Roman Numerals representing Minor Chords and the degree sign representing the one Diminished Chord that is found in each Major Scale. By playing the Major Scale in any key, you take one loop around the rainbow colored spiral diagram:

ISBN 978-0-7394-2609-4

MUSIC WORMHOLE, A MUSIC EDUCATION AND ENTERTAINMENT SYSTEM

CROSS-REFERENCE TO RELATED APPLICATIONS

The present invention is a continuation of U.S. Ser. No. 13/098,258, filed Apr. 29, 2011, claims priority to the priority date of that application and incorporates all disclosure of Ser. No. 13/098,258 at least by reference.

BACKGROUND OF THE INVENTION

1. Field of the Invention

The present invention is in the technical field of music education.

2. Description of Related Art

In the art prior to the priority date of the present application musical score sheets and music books are available in which the player follows the melody and harmony determined by the composer or plays individual chords not connected in a manner consistent with music theory, resulting in little music theory knowledge being transferred to the player.

BRIEF SUMMARY OF THE INVENTION

Music Wormhole is a system for showing the finger positions on a multiple different musical instruments for all the chords in all the keys of the Major Scale, color coordinated to western music's twelve point chromatic scale, showing key signatures and other relevant musical information.

Music Wormhole is the name of the parent product with offspring product names including the Piano Wormhole, Guitar Wormhole, Ukulele Wormhole, Bass Guitar Wormhole, Violin Wormhole, Banjo Wormhole, Saxophone Wormhole, Trumpet Wormhole, Flute Wormhole, Chord Spelling Wormhole, Notation Wormhole, Voice/Solfeggio Wormhole and others.

This product has been developed as a printed media product with two pages of laminated cardstock joined together with a grommet allowing the rotating disc of chord information printed on the back page to be visible through the window cut out of the front page.

In another embodiment, this system may be implemented as an interface display driven by software executing on a computer appliance with the digital version of this product having the same look and feel as the printed version and utilizing the computerized commands such as sliding a finger across a screen, mouse movements and pressing enter.

The invention is for music education and music entertainment.

BRIEF DESCRIPTION OF THE SEVERAL VIEWS OF THE DRAWINGS

FIG. 16: Intellectual Property Rights

FIG. 18: Instructional Text on how to use this product

FIG. 32: Audible Range Instructional Text

FIG. 42: Ukulele Wormhole, Front Page Back Side.

DETAILED DESCRIPTION OF THE INVENTION

Figure 1:
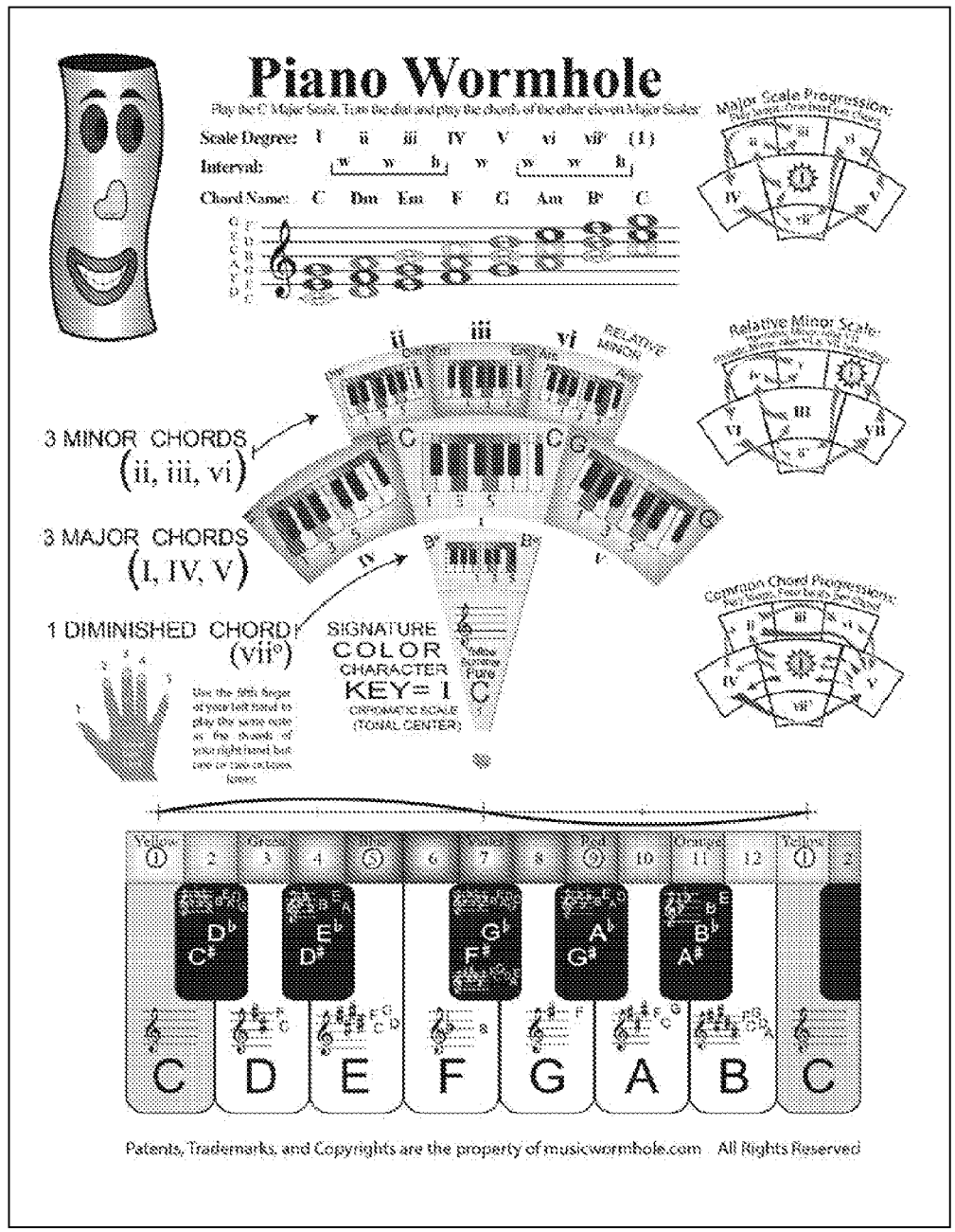
FIG. 1: Piano Wormhole front showing the "C Major Scale"

FIG. 1 shows the front side of the front page of the Piano Wormhole product with the cut-out window in the front page showing the "C Major Scale". The "C Major Scale" is printed on a second page which is joined to the front page with a grommet and is a rotating disc of chord information.

Figure 2:
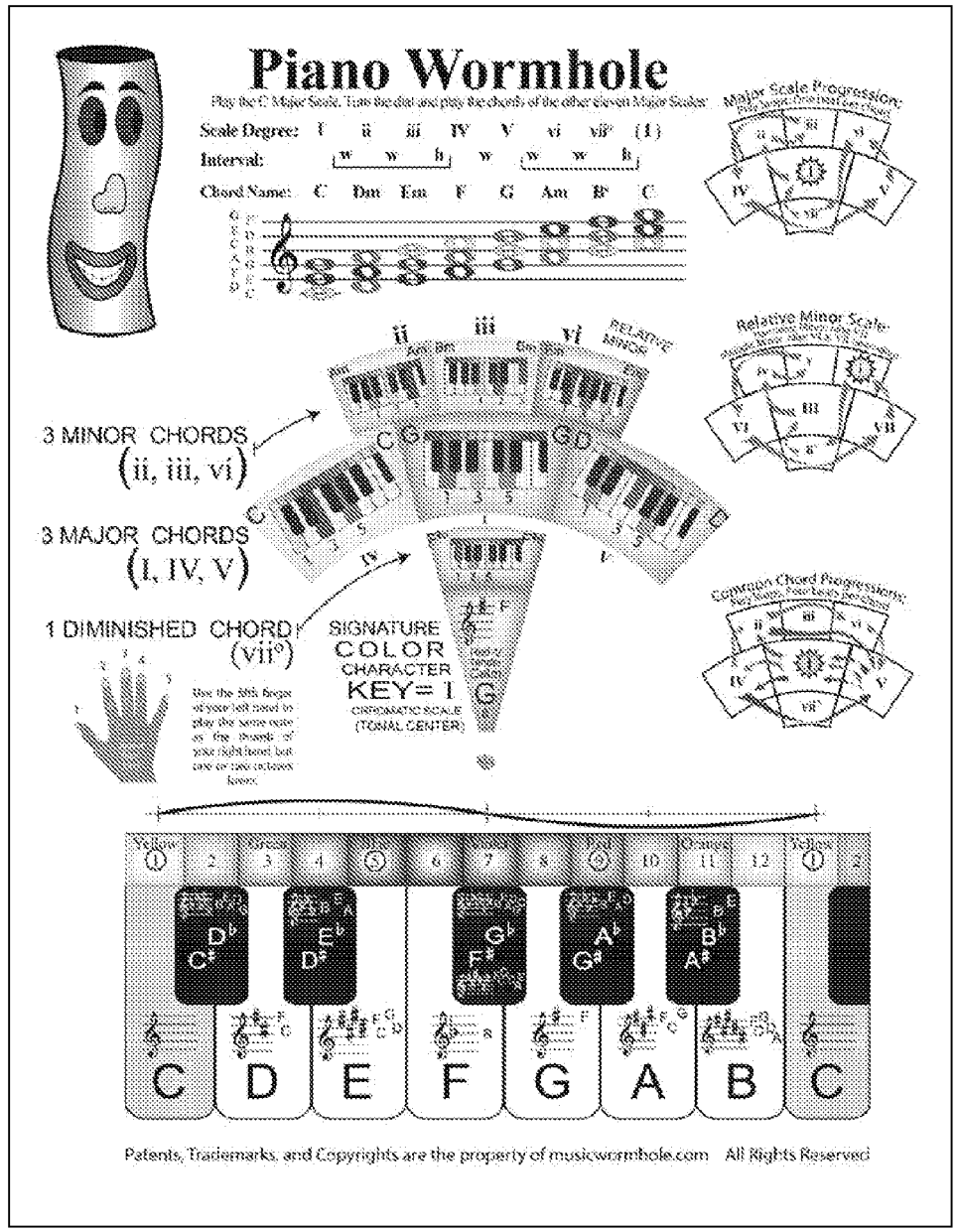
FIG. 2: Piano Wormhole front showing the "G Major Scale"

FIG. 2 shows the front side of the front page of the Piano Wormhole product with the cut-out window in the front page showing the "G Major Scale". The "G Major Scale" is printed on a second page which is joined to the front page with a grommet and is a rotating disc of chord information.

Figure 3:
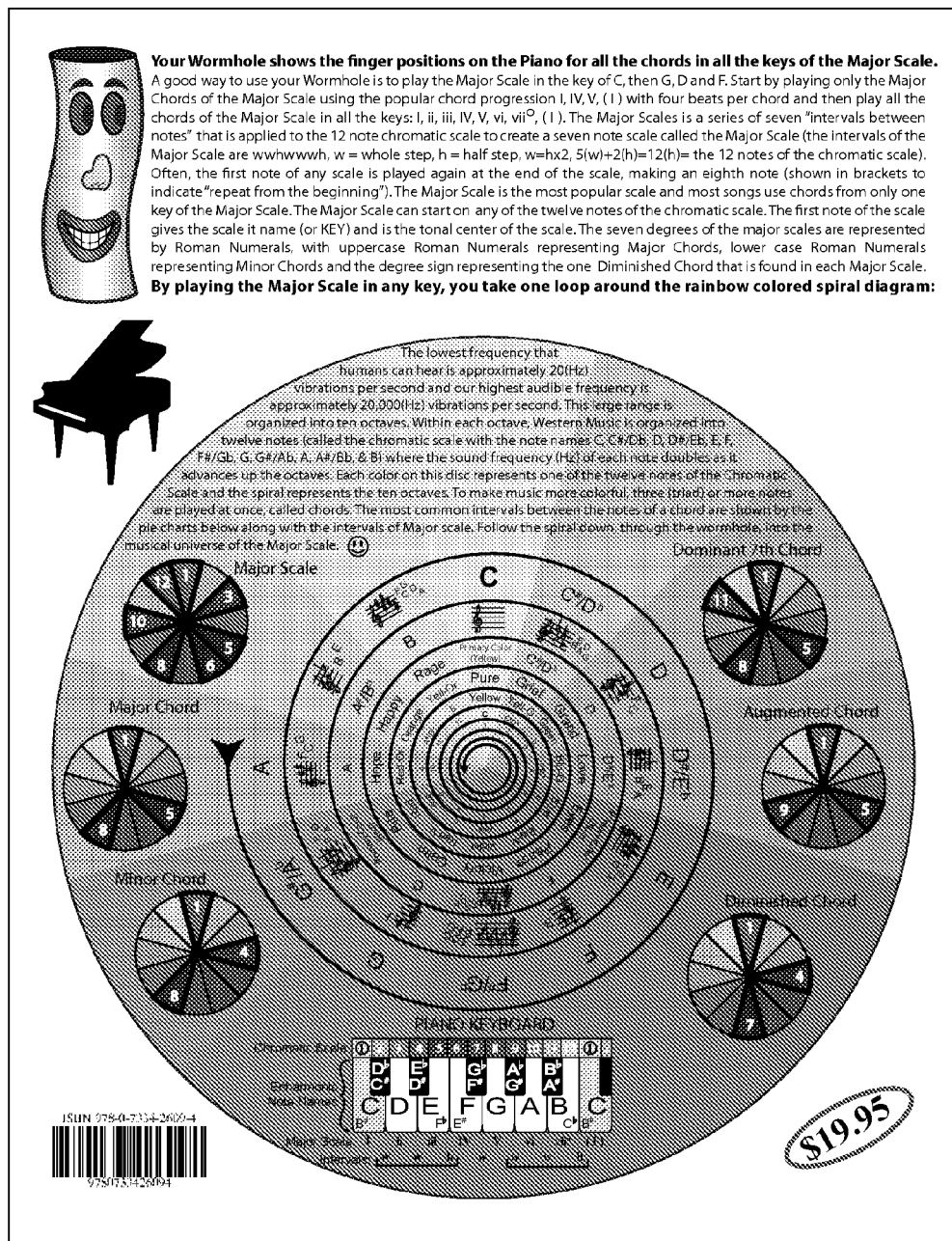
FIG. 3: Piano Wormhole back

FIG. 3 shows the back side of the front and back pages of the Piano Wormhole product.

Figure 4:
FIG. 4: Guitar Wormhole front showing the "C Major Scale"

FIG. 4 shows the front side of the front page of the Guitar Wormhole product with the cut-out window in the front page showing the "C Major Scale". The "C Major Scale" is printed on a second page which is joined to the front page with a grommet and is a rotating disc of chord information.

Figure 5:
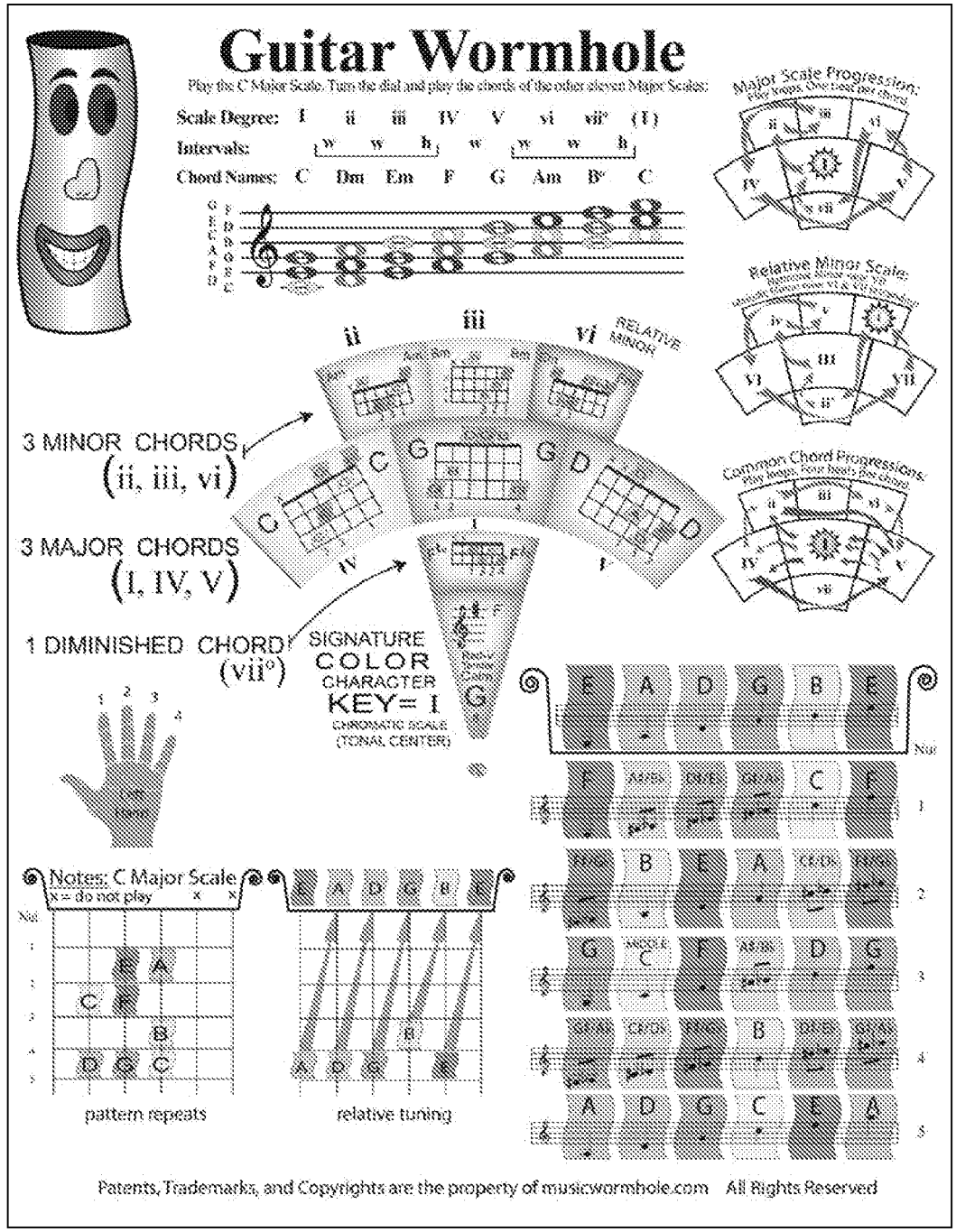
FIG. 5: Guitar Wormhole front showing the "G Major Scale"

FIG. 5 shows the front side of the front page of the Guitar Wormhole product with the cut-out window in the front page showing the "G Major Scale". The "G Major Scale" is printed on a second page which is joined to the front page with a grommet and is a rotating disc of chord information.

Figure 6:
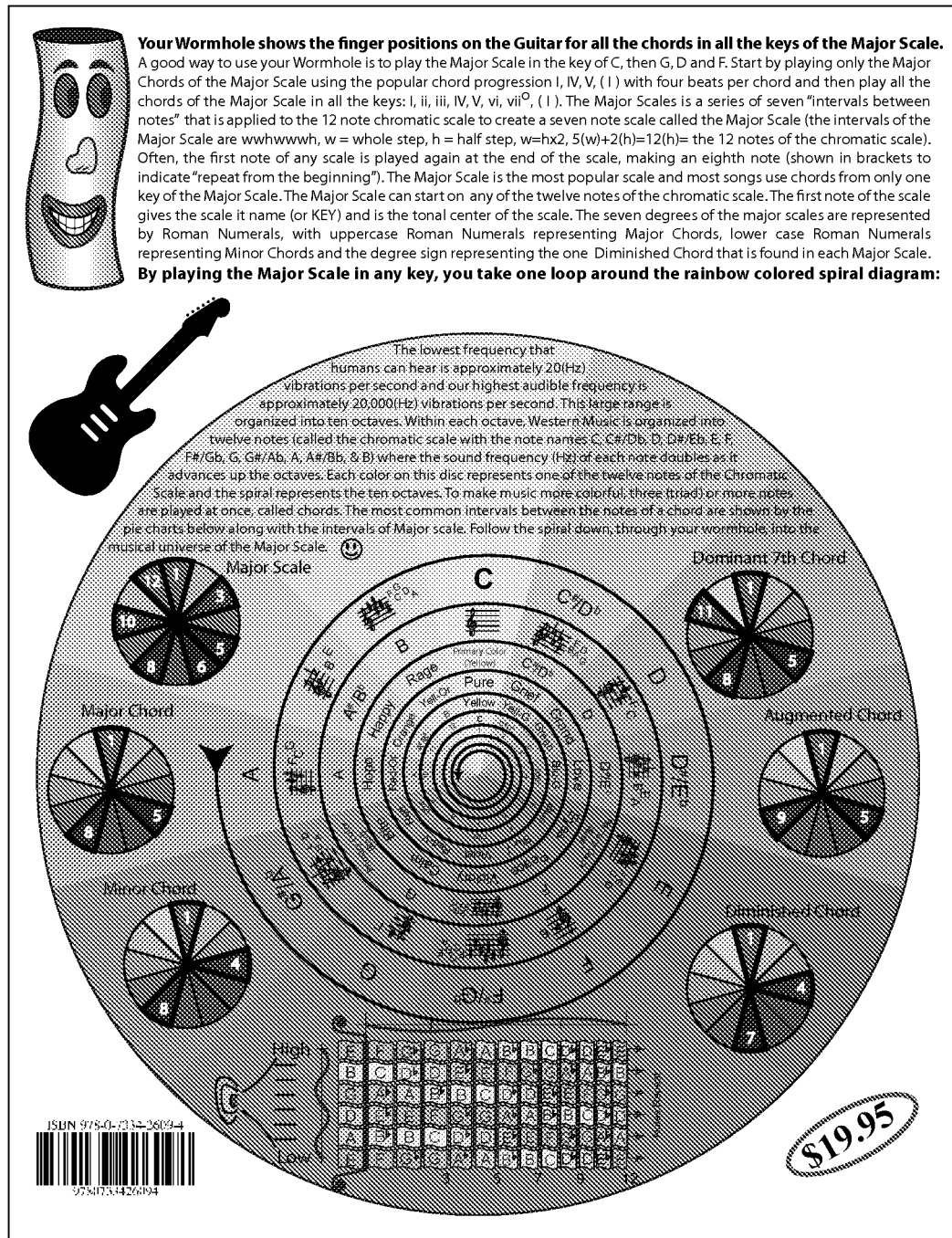
FIG. 6: Guitar Wormhole back

FIG. 6 shows the back side of the front and back pages of the Guitar Wormhole product.

FIG. 1 through FIG. 6 identify the basic functionality of the product which is a rotating disc of chord information overlaid with a page of musical information designed to make the chord information shown through the cut-out window meaningful.

This methodology has been applied to multiple musical instruments with the Piano shown in FIGS. 1, 2, and 3, the Guitar shown in FIGS. 4, 5, and 6 and the Ukulele shown on FIGS. 41, 42, 43, and 44. This methodology has been applied to create other "Wormhole" products for other musical instruments that are not shown here.

Figure 7:
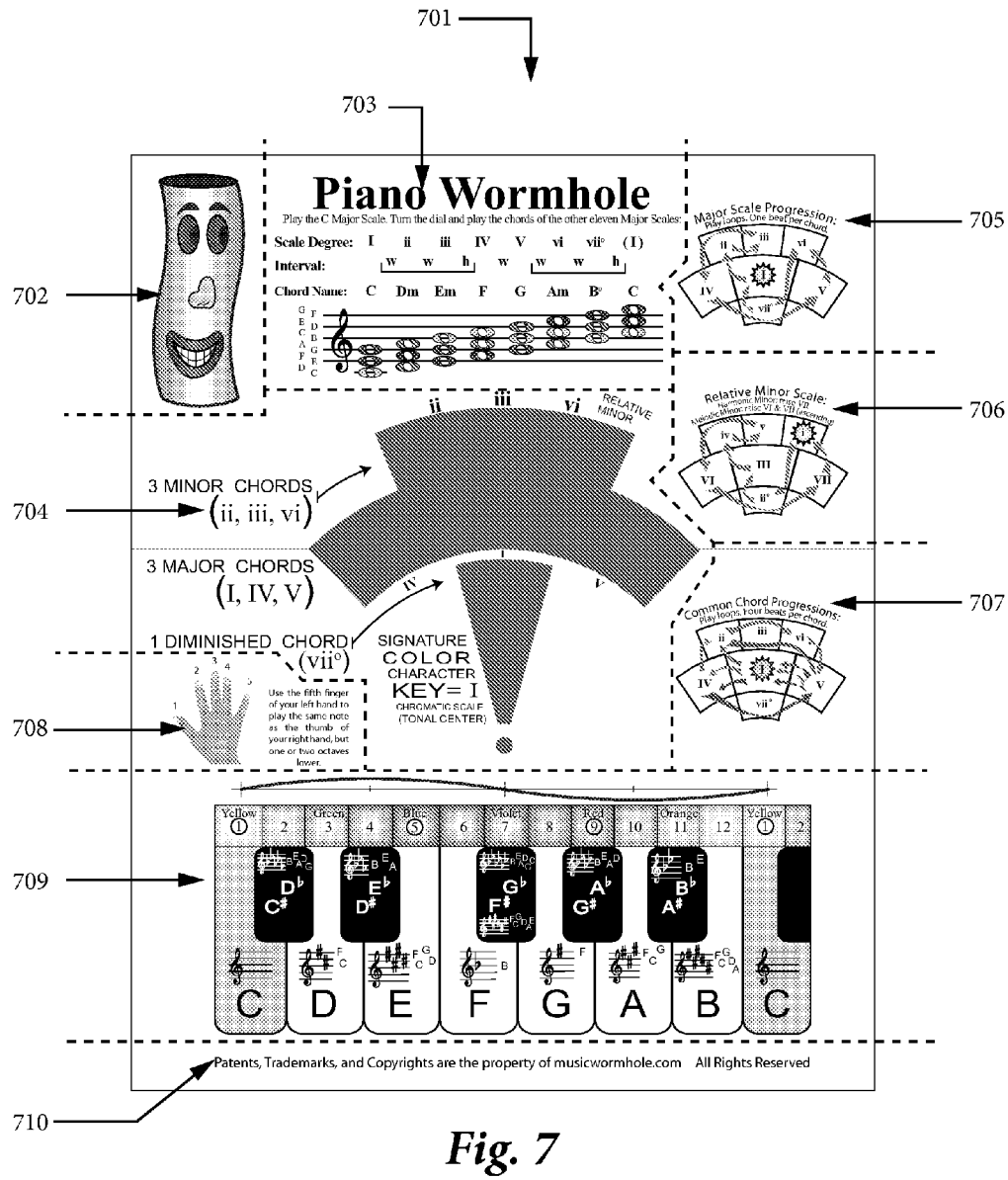
FIG. 7: Piano Wormhole, Front Page Front Side (dashed lines divide diagram)
Figure 8:
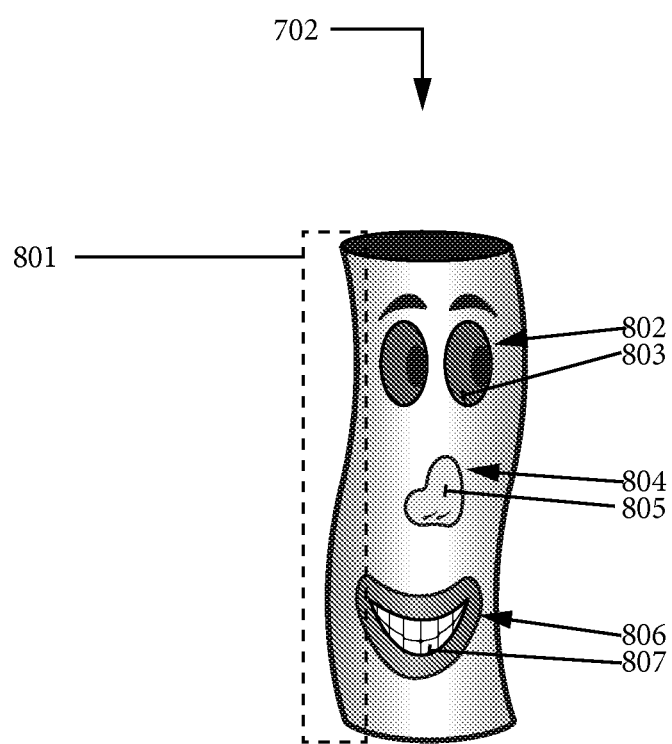
FIG. 8: Logo representing a product of the invention
Figure 9:
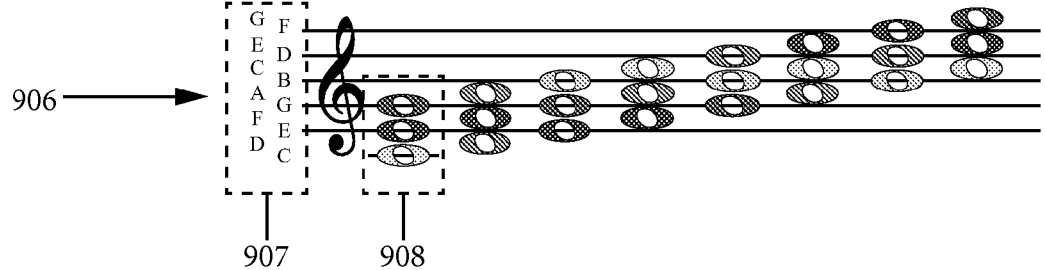
FIG. 9: Title of this product with sub-title showing the "C Major Scale" on Staff lines
Figure 10:
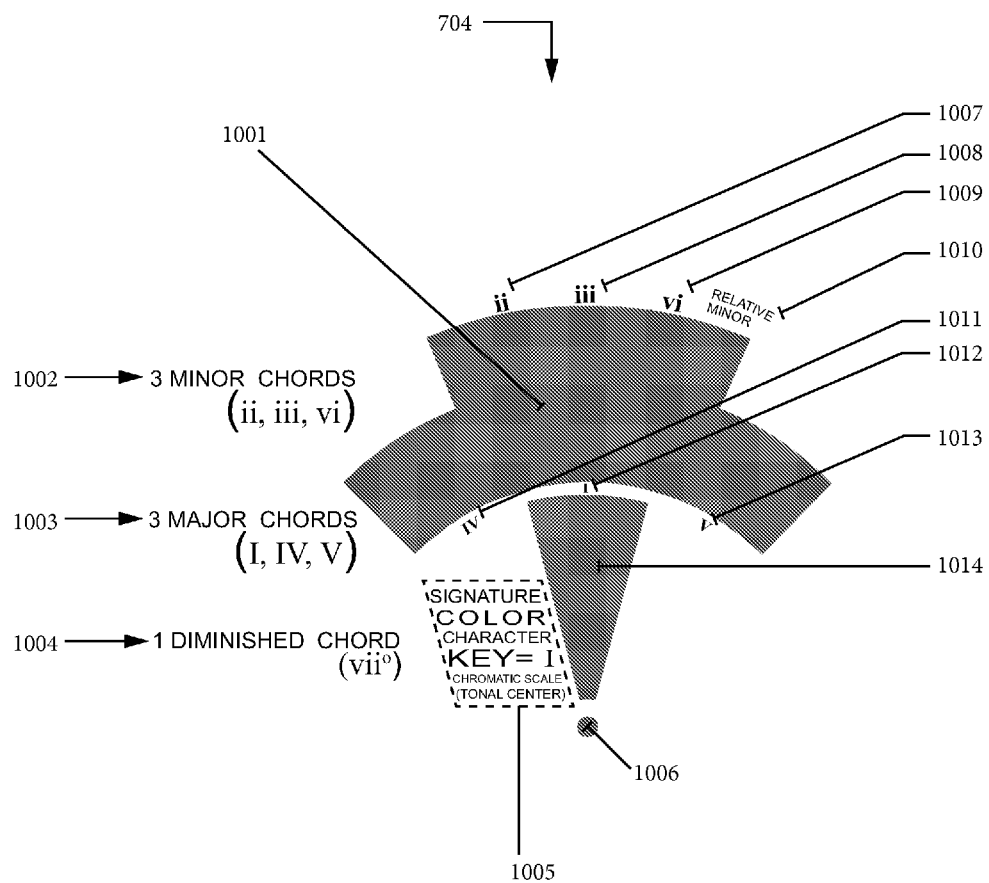
FIG. 10: Chord Identification around "Ice Cream Cone" shaped window.
Figure 11:
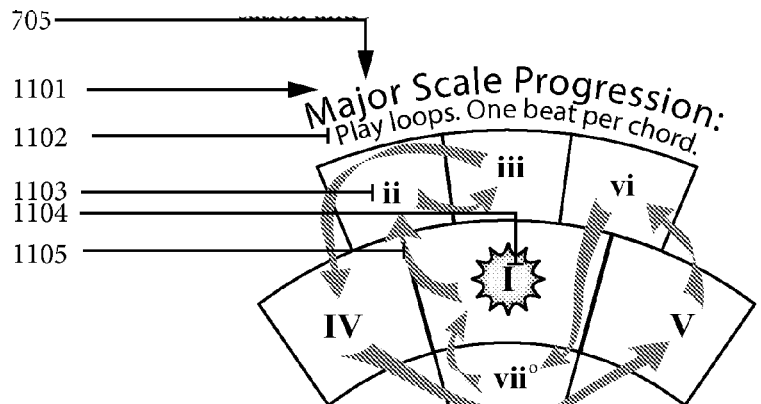
FIG. 11: Major Scale Progression flowchart
Figure 12:
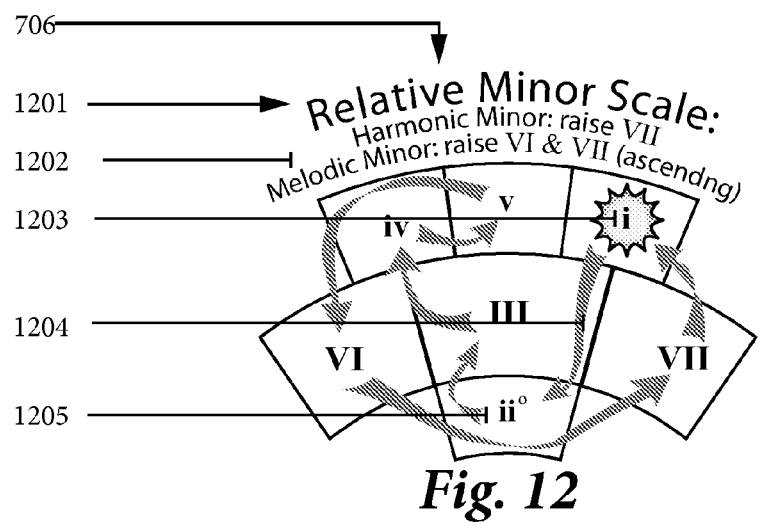
FIG. 12: Relative Minor Scale Progression flowchart
Figure 13:
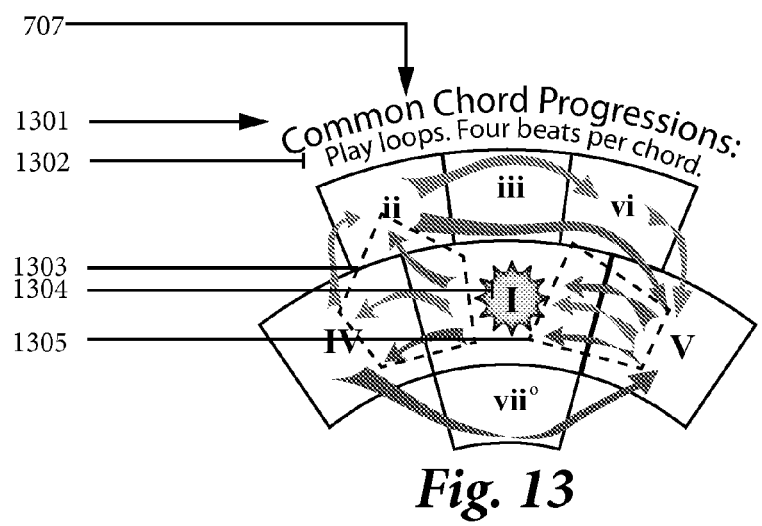
FIG. 13: Common Chord Progressions flowchart
Figure 14:
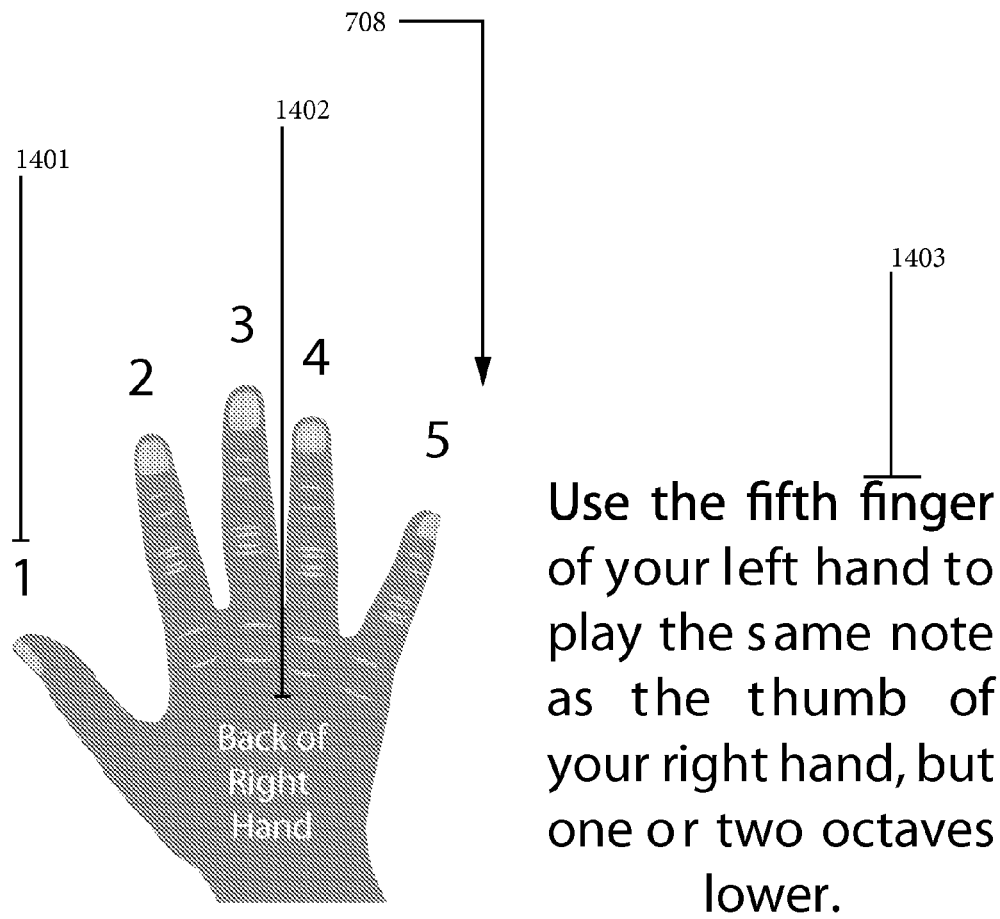
FIG. 14: Finger Numbers
Figure 15:
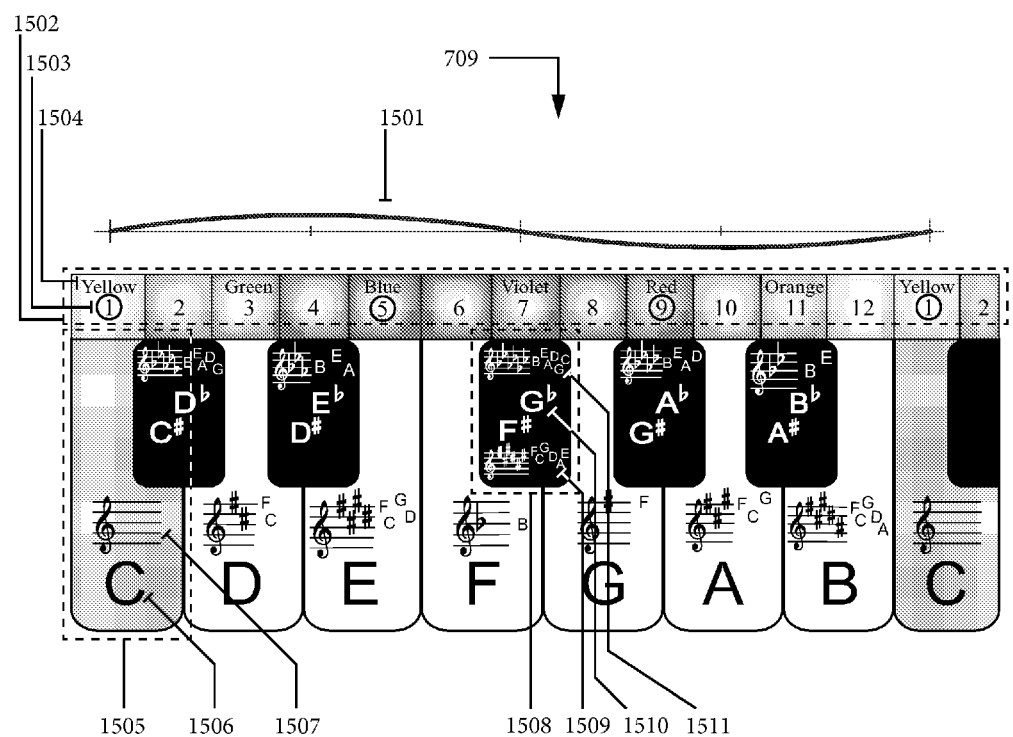
FIG. 15: Piano Keyboard

FIG. 7 shows the front of the first page of the Piano Wormhole. To facilitate closer analysis, this figure is broken out with dashed lines into multiple drawings, namely:

FIG. 8: Logo representing a product of the invention.
FIG. 9: Title of this product with sub-title showing the "C Major Scale" on Staff.
FIG. 10: Chord Identification around "Ice Cream Cone" shaped window.
FIG. 11: Major Scale Progression flowchart.
FIG. 12: Relative Minor Scale Progression flowchart.
FIG. 13: Common Chord Progressions flowchart.
FIG. 14: Finger Numbers.
FIG. 15: Piano Keyboard.
FIG. 16: Intellectual Property Rights.
FIG. 8 shows the Music Wormhole logo.

The logo is intended to represent a vibrating musical string personified. Element 801 highlights the length of the logo string which is a sine wave. Stringed musical instruments, for example the Guitar, generate a sine wave when their strings are played.

The top of the logo shows a cylindrical head to provide a three dimensional appearance and emphasis the string characteristics.

The nose (element 804) of the "Wormhole face" is in the middle of the sine wave. The eyes (element 802) are located one third of the total sine wave length above the nose and the mouth (element 806) is located one third of the sine wave length below the nose.

Figure 33:
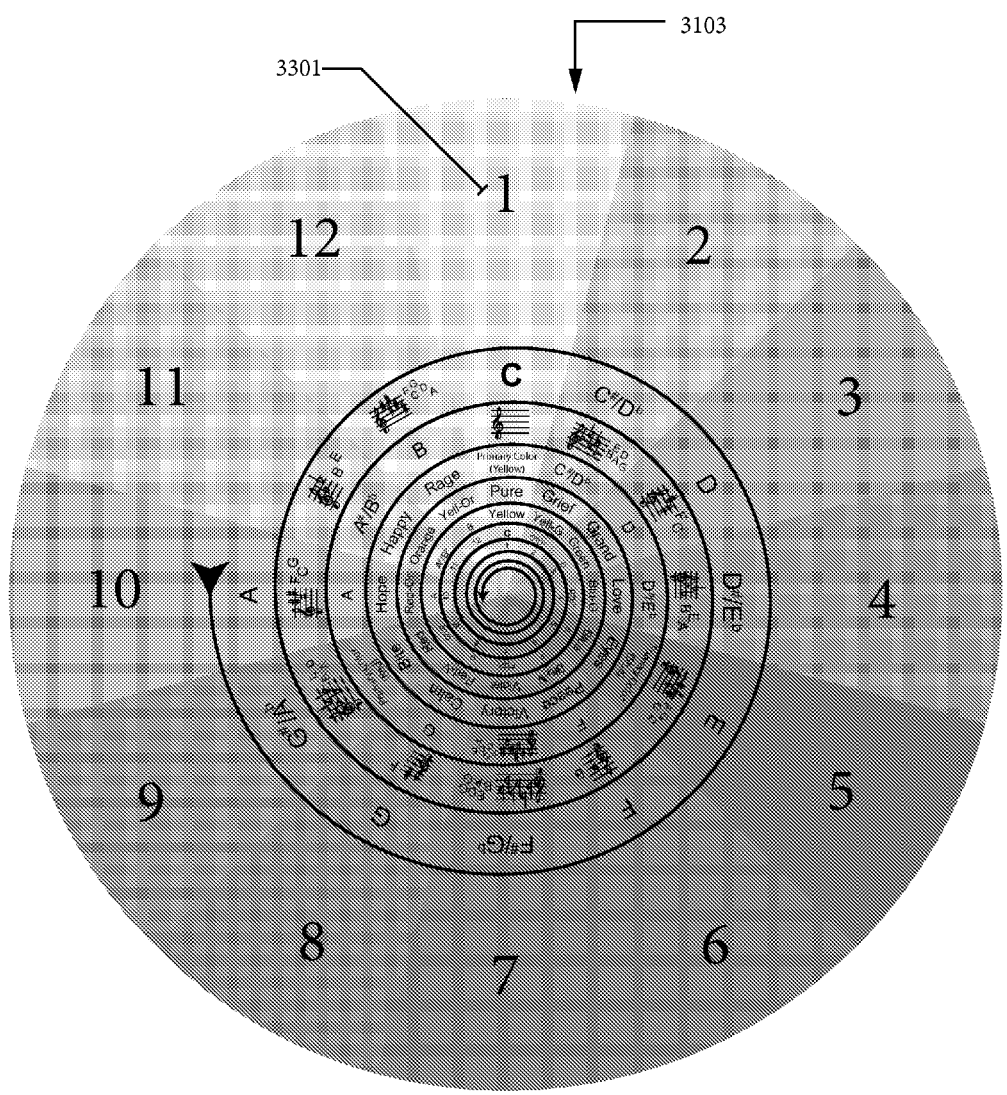
FIG. 33: Octave Spiral with Chromatic Scale and Colors

The nose (element 804) of the "Wormhole face" shows element 805 to identify the specific color of the nose which is Yellow, one of the three primary colors and the color assigned to the note of "C" in the color scheme of this invention (see FIG. 33). The eyes (element 802) shows element 803 to identify the specific color of the eyes which are blue, one of the three primary colors and the color assigned to the note of "E" in the color scheme of this invention. The mouth (element 806) shows element 807 to identify the specific color of the mouth which is Red, one of the three primary colors and the color assigned to the note of "G#/Ab" in the color scheme of this invention.

The three notes "C, E and G#/Ab" are equally spaced within any musical octave and these three objects "nose, eyes and mouth" are equally spaced within the Wormhole Logo.

FIG. 9 shows the name of this product which is "Piano Wormhole" (identified by element 901) as well as the several sub-title lines that accompany the title and add relevant music information.

Element 902 is the first sub-title line, giving the reader instructions on how to use the Wormhole product which is to "Play the C Major Scale. Turn the dial and play the chords of the other eleven Major Scales".

Element 903 identifies the Scales Degrees of the Major Scale, namely: I ii iii IV V vi vii' (I). The brackets around the "I" at the end of the sequence indicate to the player to "repeat from the beginning".

Element 904 identifies the "Intervals" between the root notes of the chords of the Major Scale. "w" identifies the interval of a "whole step" while "h" identifies the interval of a "half step". Two half steps equal one whole step. The Major Scales is a series of seven "intervals between notes" that is applied to the twelve note chromatic scale to create a seven note scale. The intervals are grouped into three groups by a bracket running underneath the intervals in order to assist the reader to identify the symmetry that exists within the interval sequence. Two groups of "wwh" are separated by one "w" step.

Element 905 identifies the chord names of the C Major Scale. Major chords are shown with a single upper case letter, minor chords are shown with an upper case letter followed by a lower case "m" to identify "minor" and the single diminished chord that is found in each major scale is shown by an upper case letter followed by the degree sign ".degree.".

Element 906 shown the Treble Clef Staff with the notes of the chords of the C Major Scale. Element 907 identifies the names of the lines and the spaces that make up the Treble Clef Staff.

Element 908 shows the notes of the triad C Major Chord, specifically C, E and G. These notes are colored according to the color scheme that runs throughout this invention where specific colors have been assigned to the twelve note chromatic scale (see FIG. 33) and these colors have been used whenever that note appears. Similarly, all the notes within the chords of the Major Scales shown on the Treble Clef Staff are colored with the specific color assigned to that note.

Figure 37:
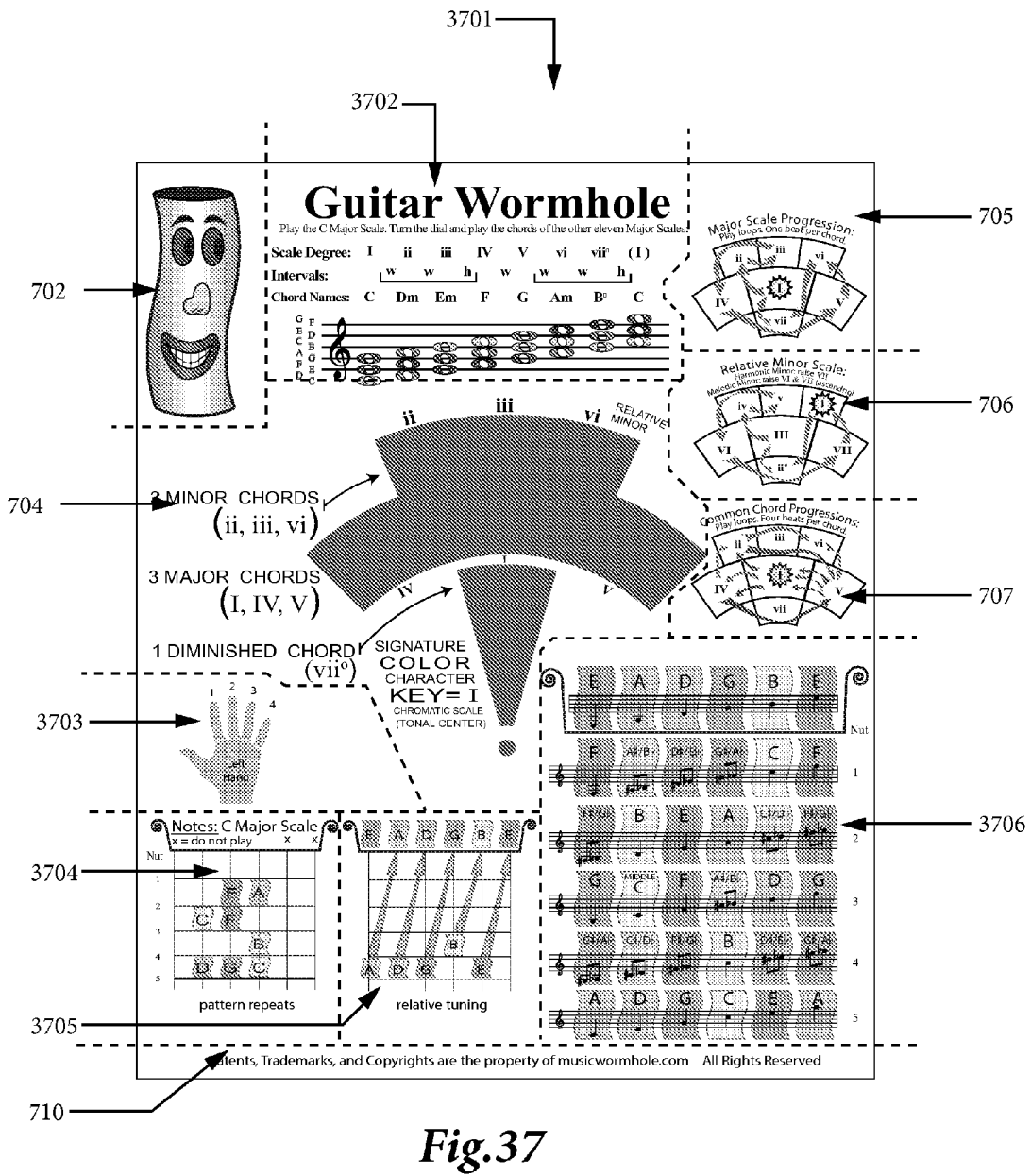
FIG. 37: Guitar Wormhole, Front Page Front Side (dashed lines divide diagram)

FIG. 37, element 3702 identifies the name of the product shown in this image as the Guitar Wormhole. The only difference between element 703 on FIG. 9 and element 3702 on FIG. 37 is the name of the product. Some wormhole products feature musical instruments which play notes in the Bass Clef Staff, for example, the Bass Guitar, in which case the Bass Clef Staff is shown and not the Treble Clef Staff.

FIG. 10 shows the Chord Identification grid that is helpful when looking through the cut out window of the front page to the chord information shown on the circular disc below.

Element 1001 and element 1014, shown in gray scale, are the windows that are cut out of the front page of the Wormhole to allow the player to view through the front page to the circular disc behind. The purpose of the gray scale area of element 1001 and element 1014 is to provide a "clipping mask" for the successful cutting of a viewing window. A paper bridge, shown by element 1012 does not get cut out and effectively creates two separate windows identified by element 1001 and element 1014.

Element 1002 identifies the three minor chords that are found in each Major Scales namely "ii iii vi". Lower case roman numerals are used to indicate that these chords are minor chords. Element 1007 shows the specific location within the viewing window where the "ii" second degree of the Major Scale can be found regardless of what Major Scales is being viewed through the window on the disc below. Similarly, elements 1008 and elements 1009 show the "iii" (third degree of the Major Scale) and "vi" (sixth degree of the Major Scale).

Element 1010 identifies the sixth degree of the Major Scale "vi" as the Relative Minor of the Major Scale. Each Major Scale has a Relative Minor Scale which shares the same key signature and the same chords as the Major Scale but has a different starting and ending chord, follows a different interval pattern (whwwhww) but shares the same chords as its relative Major Scale. The Relative Minor Scale Progression is shown by FIG. 12

Element 1003 identifies the three major chords that are found in each Major Scales namely; "I, IV, and V". Upper case roman numerals are used to indicate that these chords are major chords.

Element 1011 shows the specific location within the viewing window where the fourth degree of the Major Scale can be found regardless of what Major Scales is being viewed through the window on the disc below. Similarly, elements 1012 shows the first degree of the Major Scale "I" and elements 1013 shows the fifth degree of the Major Scale "V".

Element 1004 identifies the one diminished chords that are found in each Major Scales namely "vii". Lower case roman numerals plus a degree sign is used to indicate that this chord is a diminished chords. Element 1014 shows the specific location within the viewing window where the seventh degree of the Major Scale can be found regardless of what Major Scales is being viewed through the window on the disc below.

Element 1005 identifies labels used to identify the content of information shown through the viewing window on the disc below. The signature, color, character, key and chromatic scale number constitute the tonal center for each key and this information is shown for each key on the rotating disc.

Element 1006 identifies the grommet point which is used to bind together the front page with its viewing window and the back page which is a rotating disc of information. The grommet point is essential to the production process as the grommet point must be perfectly aligned to allow the rotating disc to be centered in the viewing window.

FIG. 11 shows the flow chart of the Major Scale Progression for the chords I i ii iii IV V vi vii (I).

Element 1101 is the title of the diagram. Element 1102 instructs the player to "Play loops. One beat per chord". Loops are chord progressions played over and over again. One beat per chord tells the player to change chords after playing the chord once.

Element 1104 shows the position of the first degree of the Major Scale in all twelve keys. This is the starting position. This is the first chord played for all the keys of the Major Scale.

Element 1105 is an arrow showing the player the position in the cut out window of the next chord in the Major Scale. Element 1105 instructs the player that after playing the "I" chord to play the "ii" chord which is shown by element 1103. The diagram shows the player position in the cut out window for all the chords of the Major Scale in all the keys of the Major Scale.

FIG. 12 shows the flow chart for the Relative Minor Scale Progression with element 1201 the title of the diagram. Element 1202 is a sub-title with relevant musical information pertaining to the Harmonic Minor Scale where the "VII" chord is raised and the Melodic Minor Scale where the "VII and VI" chords are raised when playing ascending chords.

Element 1203 in FIG. 10 identifies the sixth degree of the Major Scale as the first degree of the Relative Minor Scale.

Element 1204 is an arrow instructing the player that after playing the first degree "i" of the Relative Minor Scale to play the second degree of the Relative minor Scale "ii". The lower case roman numerals show that the "i" of the Relative Minor Scale is a minor chord and that the second degree of the Relative Minor Scale "ii" is a diminished chord shown by element 1205. FIG. 12 shows the player the position in the cut out window of all the chords in all the keys of the Relative Minor Scale.

FIG. 13 shows the flow chart for Common Chord Progressions with element 1301 the title of the diagram. Element 1302 instructs the player to "Play loops. Four beats per chord". Loops are chord progressions played over and over again. Four beats per chord tells the player to change chords after playing each chord four times.

Element 1304 shows the starting position for all three Common Chord Progressions, each shown with a different colored arrow.

Element 1303 shows three different colored arrows leaving the starting position identified by element 1304 and going to the next degree of that colored arrow's chord progression. Element 1305 show the three different colored arrows completing their loop and returning the one "I" chord at the beginning of the progression.

FIG. 14 show the back of the right hand of an average person (element 1402) and identifies the finger numbers for each finger and thumb on the right hand. Element 1401 identifies the thumb of the right hand as "1", the index finger as "2", the middle finger as "3", the ring finger as "4" and the pinky finger as "5". This information correlates with the finger position numbers shown on the chord diagrams on the rotating disc of information (see FIG. 22) viewed through the cut out window of the front page. Element 1403 instructs the player to "use the fifth finger of your left hand to play the same note as the thumb of your right hand, but one or two octaves lower."

FIG. 37, element 3703 identifies the left hand of an average person and numbers the index finger as one, the middle finger as two, the ring finger as three and the pinky finger as four. These are the fingers that the guitar player uses to press the guitar stings against the frets on the guitar neck when playing notes or chords. The chord segments shown on the rotating disc of chord information include finger numbers to assist the player in the use of the correct fingers.

FIG. 15 shows one octave of the Piano Keyboard with several unique attributes including the names of the keys, the key signature of the key shown on the key, the color of the key and the chromatic scale number of each key.

Element 1505 highlights the key of "C", shown in the color Yellow and found immediately to the left of the group of two black keys. The key of "C" is assigned to be the first note in the chromatic scale and is assigned the primary color of Yellow.

Element 1506 identifies the note names for that key and element 1507 identifies the key signature for that key. All the other "white keys", D, E, F, G, A, and B are similarly named and their key signatures are similarly shown on the respective keys.

Element 1508 identifies the key of "F#/Gb", the middle of five "black keys".

Element 1510 identifies the name of this black key as "F#/Gb". This name is called "enharmonic" meaning that two names describe one key, the name "F#" identifies this key as does the name "Gb". In element 1510 both names, "F#/Gb" are shown on the key. This key also has two key signature, one with six sharps identified by element 1509 and one with six flats identified by element 1511. The enharmonic note names and the key signatures for the other four "black keys" are similarly shown.

Element 1502 identifies a strip of colored square above each key with the chromatic scale number of each key shown. The key of "C" is assigned the number one and the other eleven notes of an octave on a Piano keyboard follow sequentially. Element 1503 identifies a circle placed around the chromatic scale number (one) on the note of "C". This circle identifies this color as a primary color and is also seen on the note of "E" which is the primary color Blue and the note of "G#/Ab" which is the primary color Red.

Colors are assigned to the notes of the chromatic scale by equal distribution of the color spectrum across the twelve notes of the chromatic scale. Element 1504 identifies the primary color Yellow is assigned to the note of "C". An interval of four half steps separates Yellow from the next primary color Blue which is assigned to the note of "E". An interval of four half steps separates Blue from the next primary color Red which is assigned to the note of "G#/Ab". An interval of four half steps separates Red from Yellow which completes the circle of color.

Element 1502 also shows the names of the secondary colors which are also separated by an interval of four half steps from one another. Green is assigned to the note of "D", Violet is assigned to the note of "F#/Gb" and orange is assigned to the note of "A#/Bb".

Tertiary colors consist of one primary color and one secondary color mixed together and six tertiary colors complete the assignment of color to the twelve notes of the chromatic scale. The tertiary colors are given a hybrid name with a hyphen separating the first part of the name from the second part of the name. The first part of the name is an abbreviation of the primary color which makes up that tertiary color and the second part of the name is an abbreviation of the secondary color name which makes up that tertiary color.

The tertiary colors and their corresponding notes are shown in Table 1 below:

TABLE 1

TABLE-US-00001 Yell-G C#/Db Blu-G D#/Eb Blu-V F Red-V G Red-O A Yell-O B

The tertiary colors are not named on element 1502 but are named on the spiral diagram shown in FIG. 33

Element 1501 shows a sine wave covering one octave of the Piano keyboard with a tick mark at the one quarter and three quarter point and a cross-hair line at the half way mark.

FIG. 37, element 3704, 3705 and 3706 are the equivalent images for the Guitar Wormhole as FIG. 15 is for the Piano Wormhole. Element 3704 identifies the first five frets of the Guitar neck and shows the location and pattern of notes which make up the notes of the "C Major Scale". These are the notes of the "C Major Scale" and not the chords of the "C Major Scale". This pattern can be used to play the notes of other Major Scales by starting the pattern on one of the other eleven notes of the chromatic scale.

FIG. 37, element 3705 identifies the top five frets of the Guitar neck and shows the relative tuning of an open string to it's neighboring string in a closed position with the correct fret identified to product the same sound as the open string, for example the first string played open produces the note "E" as does the second string played closed at the fifth fret. In a similar manner, the other strings can be tuned correctly relative to each other.

FIG. 37 element 3706 identifies the large image of the first five frets of the Guitar neck and shows the music notation on a Treble Clef Staff line of the note produced by that fret on that string. These notes are colored according to the color methodology that has been used through-out this product.

FIG. 16 identifies the intellectual property rights that Music Wormhole claims as it's property. Element 1601 states "Patents, Trademarks, and Copyrights are the property of musicwormhole.com". Element 1602 states "All Rights Reserved".

Figure 17:
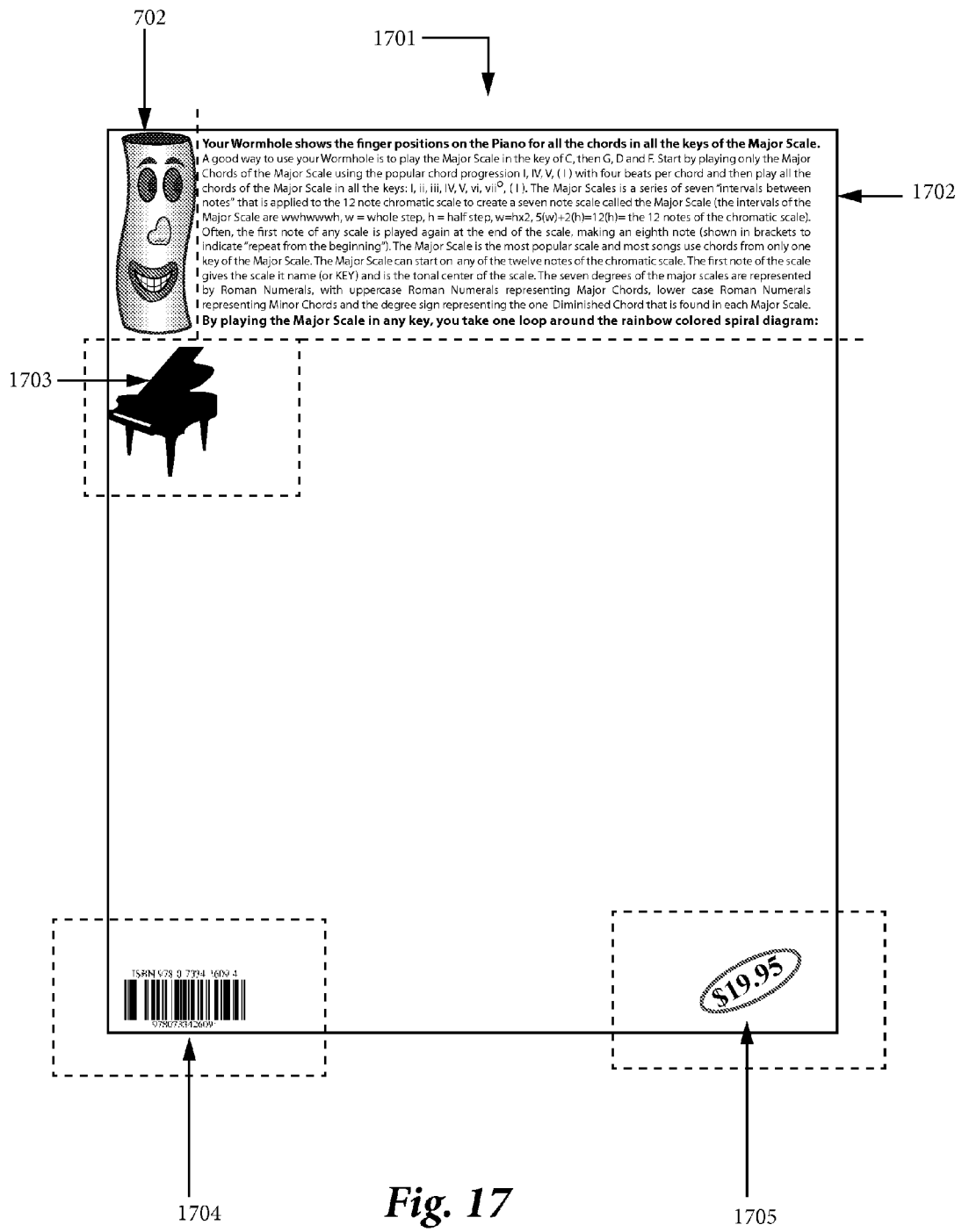
FIG. 17: Front Page Back Side of Piano Wormhole (dashed lines divide diagram)

FIG. 17 shows the back side of the front page of the Piano Wormhole. This figure is broken out with dashed lines into multiple drawings namely: [0127] FIG. 8: Logo representing a product of the invention [0128] FIG. 18: Instructional Text on how to use this product [0129] FIG. 19: Instrument Image [0130] FIG. 20: ISBN [0131] FIG. 21: Price FIG. 8 shows the Music Wormhole logo and has been covered as an element of FIG. 7.

FIG. 18 is an Instructional Text on how to use this product, intended to guide the user in the correct use of the product. Element 1801 identifies the top line of text which is in bold type while element 1803 identifies the bottom line of text which is also in bold type. These two bold type lines "sandwich" the body of text identifies by element 1802.

The text reads: "Your Wormhole shows the finger positions on the Piano for all the chords in all the keys of the Major Scale. A good way to use your Wormhole is to play the Major Scale in the key of C, then G, D and F. Start by playing only the Major Chords of the Major Scale using the popular chord progression I, IV, V, (I) with four beats per chord and then play all the chords of the Major Scale in all the keys: I, ii, iii, IV, V, vi, viio, (I). The Major Scales is a series of seven "intervals between notes" that is applied to the 12 note chromatic scale to create a seven note scale called the Major Scale (the intervals of the Major Scale are wwhwwwh, w=whole step, h=half step, w=h.times.2, 5(w)+2(h)=12(h)=the 12 notes of the chromatic scale). Often, the first note of any scale is played again at the end of the scale, making an eighth note (shown in brackets to indicate "repeat from the beginning"). The Major Scale is the most popular scale and most songs use chords from only one key of the Major Scale. The Major Scale can start on any of the twelve notes of the chromatic scale. The first note of the scale gives the scale it name (or KEY) and is the tonal center of the scale. The seven degrees of the major scales are represented by Roman Numerals, with uppercase Roman Numerals representing Major Chords, lower case Roman Numerals representing Minor Chords and the degree sign representing the one Diminished Chord that is found in each Major Scale. By playing the Major Scale in any key, you take one loop around the rainbow colored spiral diagram:"

Figure 38:
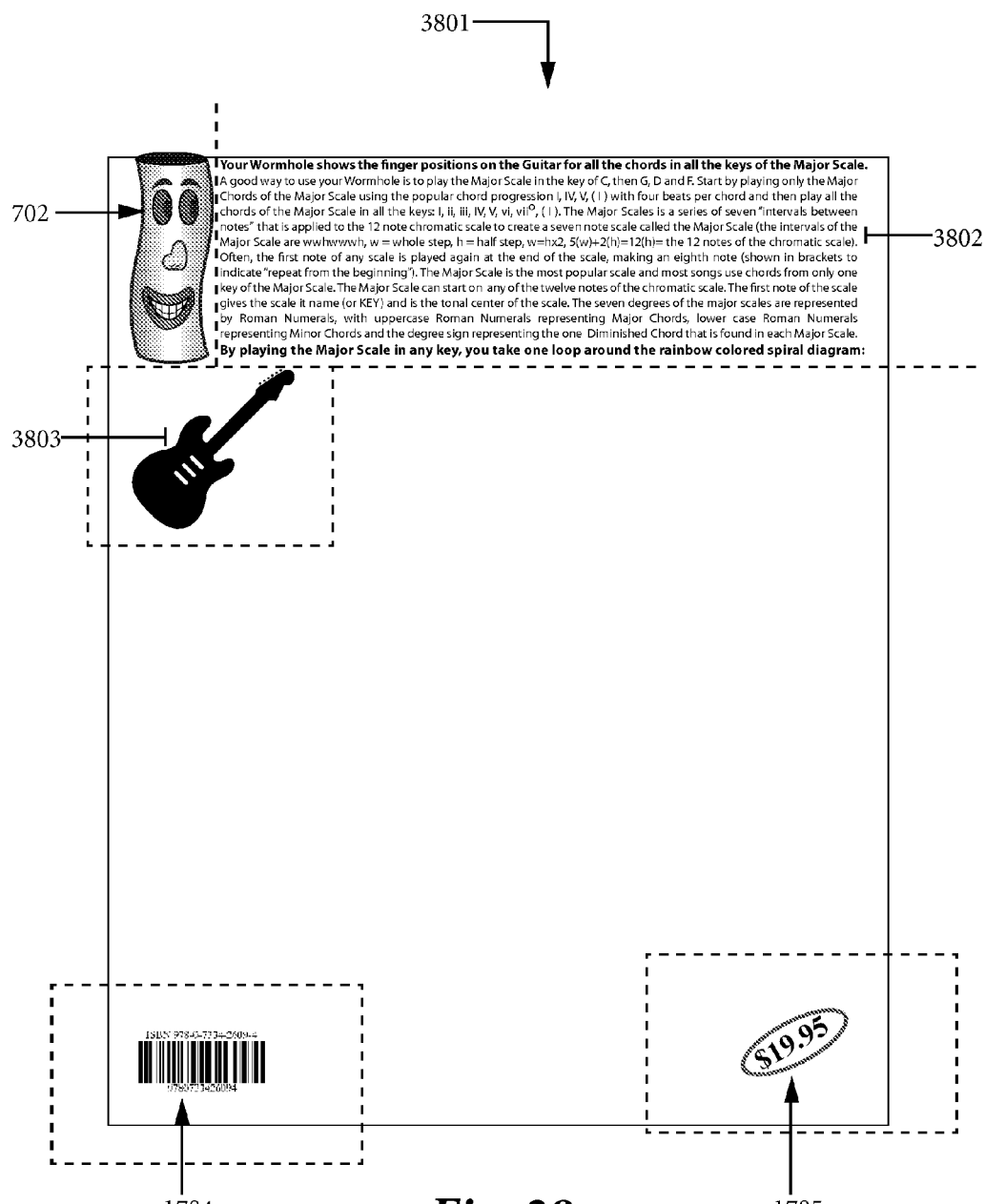
FIG. 38: Guitar Wormhole, Front Page Back Side (dashed lines divide diagram)

FIG. 38, element 3801 and 3802 identify the same block of text on the Guitar Wormhole product with the only change being the name of the musical instrument stated in the middle of the top line and element 3803 which identifies the image of the musical instrument to which the Wormhole product pertains, in this case a Guitar.

Figure 19:
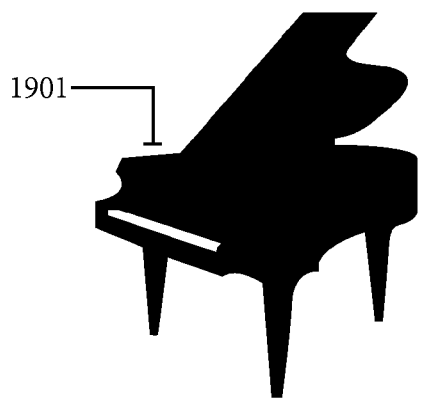
FIG. 19: Instrument Image

FIG. 19 is an Instrument Image showing an image of the instrument to which the Wormhole pertains. This Wormhole is a Piano Wormhole, therefore an image of a Piano is shown here. Similarly for a Guitar Wormhole, an image of a Guitar is shown here. The same logic applies to Wormhole products for other instruments.

Figure 20:
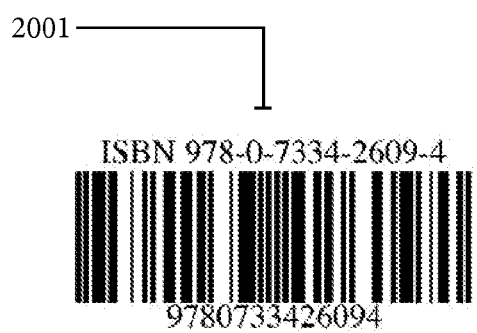
FIG. 20: ISBN

FIG. 20 displays ISBN information. The inventor's intention is to offer this product to the public with the benefit of an ISBN number and barcode. The information shown here is generic information used to show size and type but is not specific to the Wormhole product.

Figure 21:
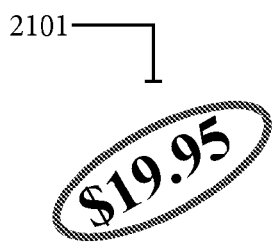
FIG. 21: Price

FIG. 21 shows price information. An intended retail price of the Wormhole product is $19.95. This information is printed on the product in an effort to provide retailers with a price guide.

Figure 22:
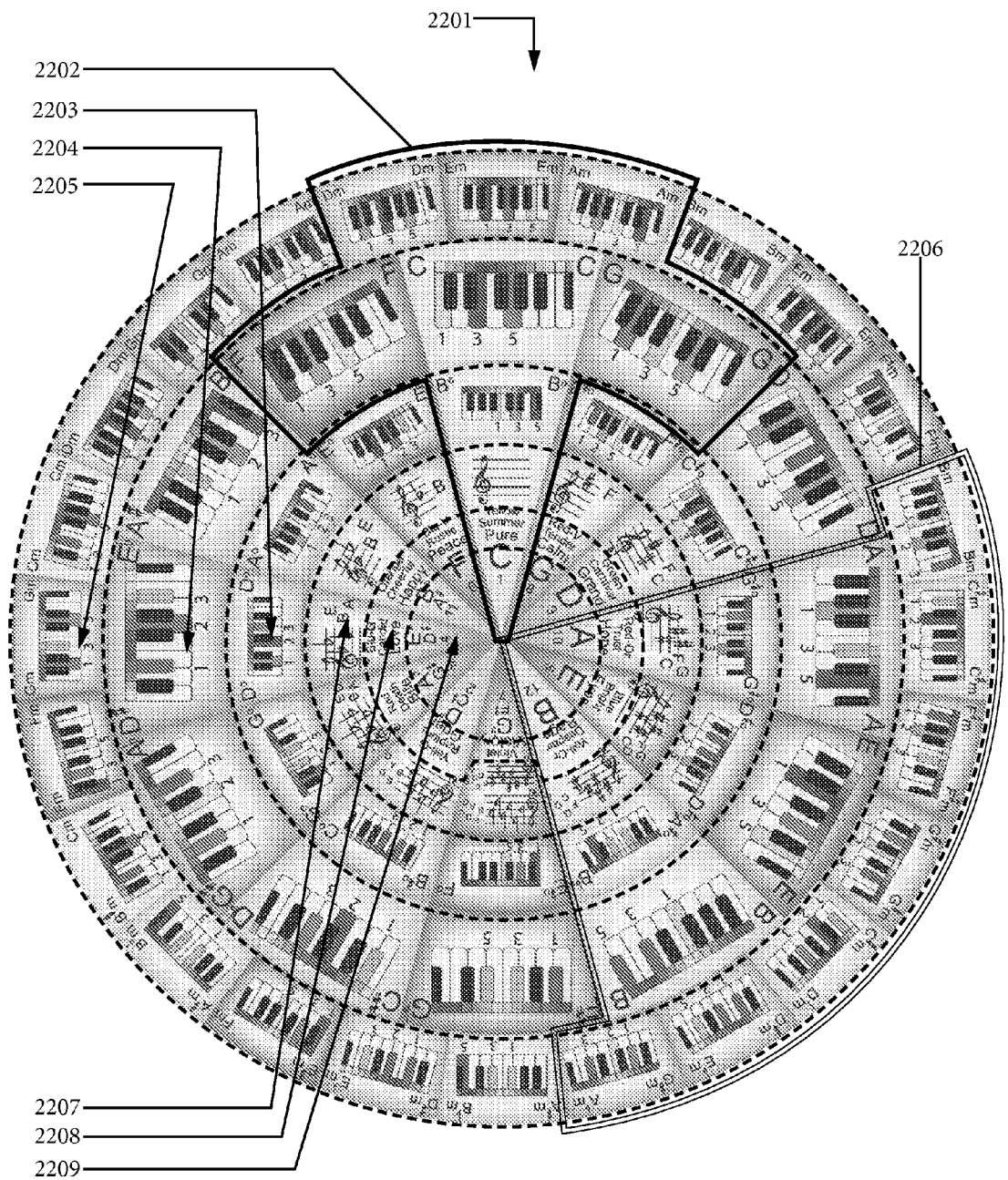
FIG. 22: Piano Wormhole Back Page, Front Side (dashed lines divide diagram)
Figure 23:
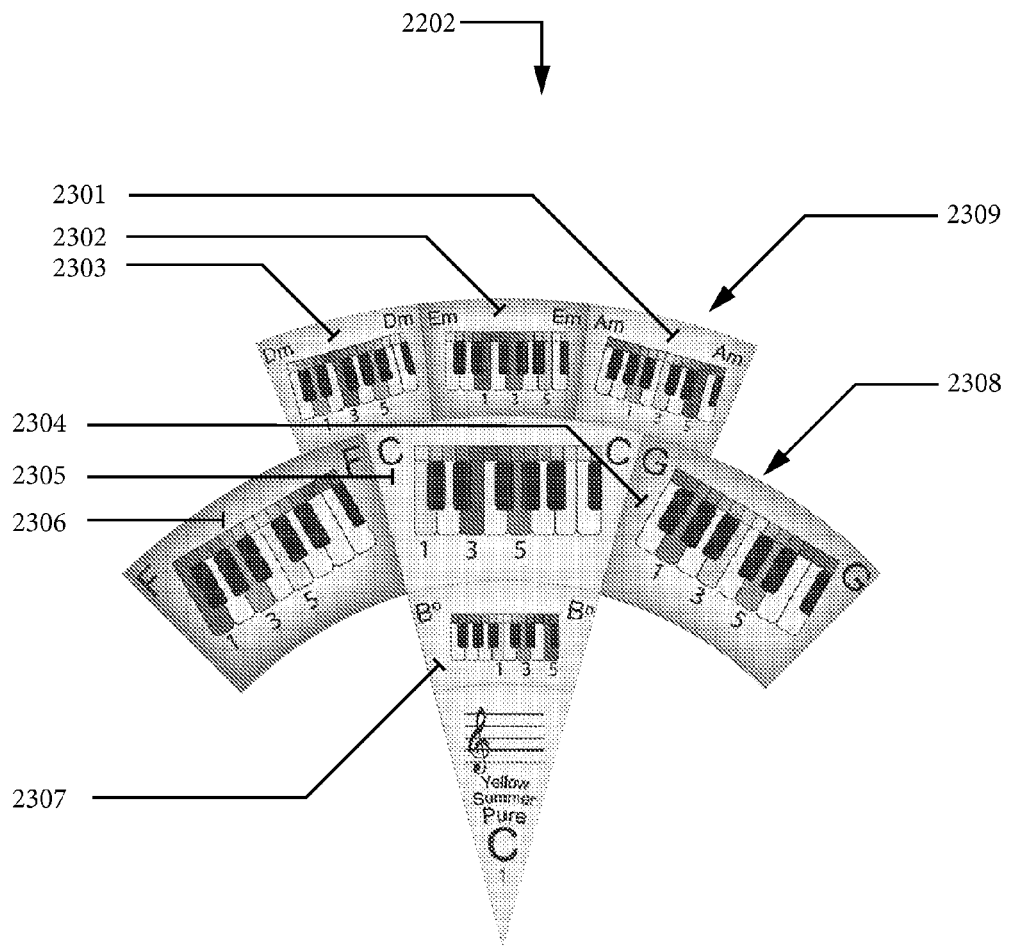
FIG. 23: "Ice-Cream Cone" shape cluster of chord information showing "C Major Scale"

FIG. 22 identifies the circular disc of chord information, with different "dashed lines" to facilitate the identification of different elements within the drawing, each of which is broken out into its own drawing with a corresponding figure number summarized below:

FIG. 23: "Ice-Cream Cone" shape cluster of chord information showing "C Major Scale"

Figure 24:
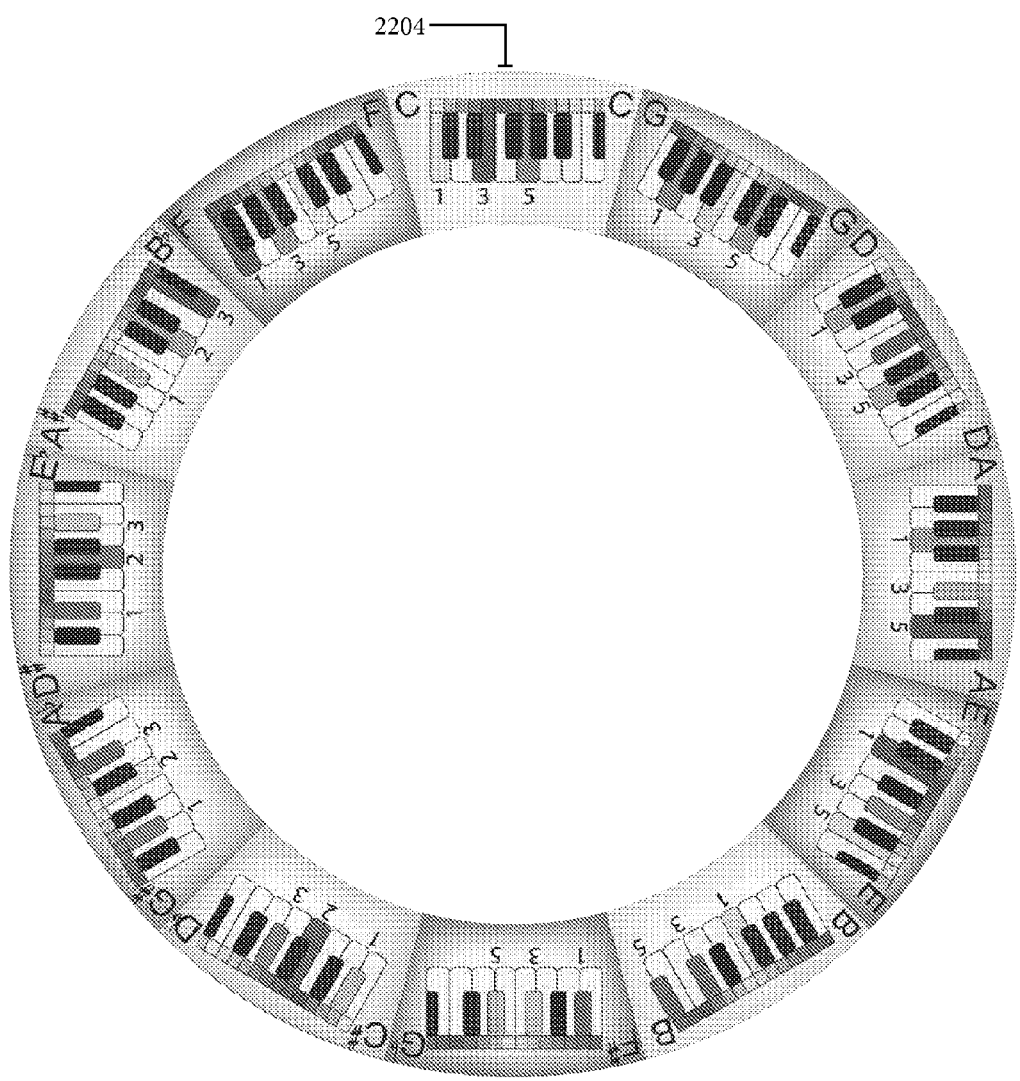
FIG. 24: Band of Major chords showing the finger positions on the musical instrument.

FIG. 24: Band of Major chords showing the finger positions on the musical instrument.

Figure 25:
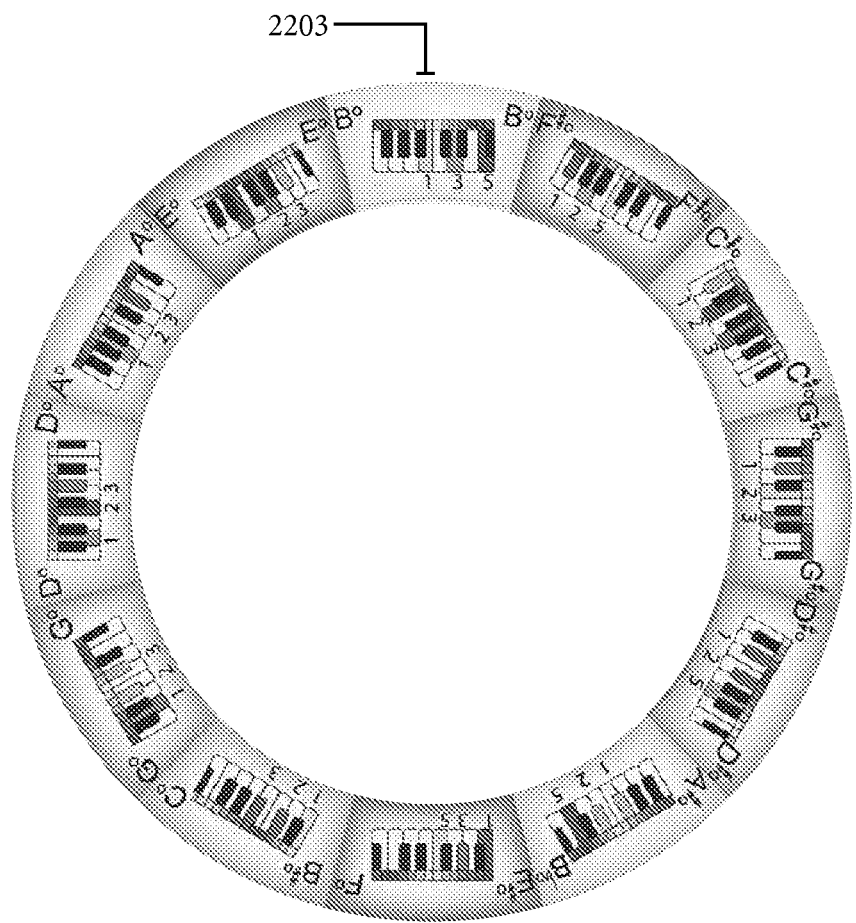
FIG. 25: Band of Diminished chords showing the finger positions on the instrument.

FIG. 25: Band of Diminished chords showing the finger positions on the instrument.

Figure 26:
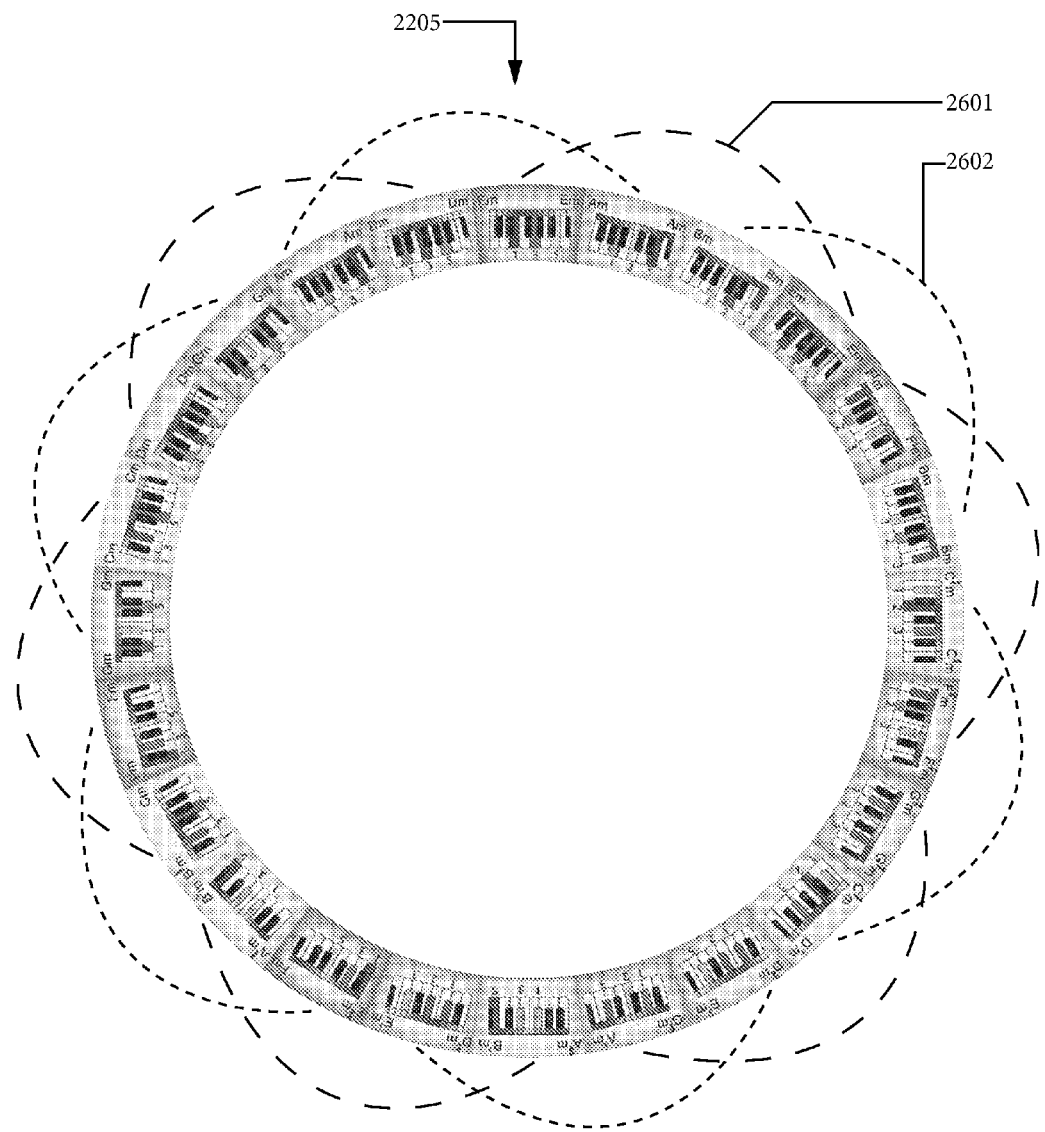
FIG. 26: Band of Minor chords showing the finger positions on the instrument.

FIG. 26: Band of Minor chords showing the finger positions on the instrument.

Figure 27:
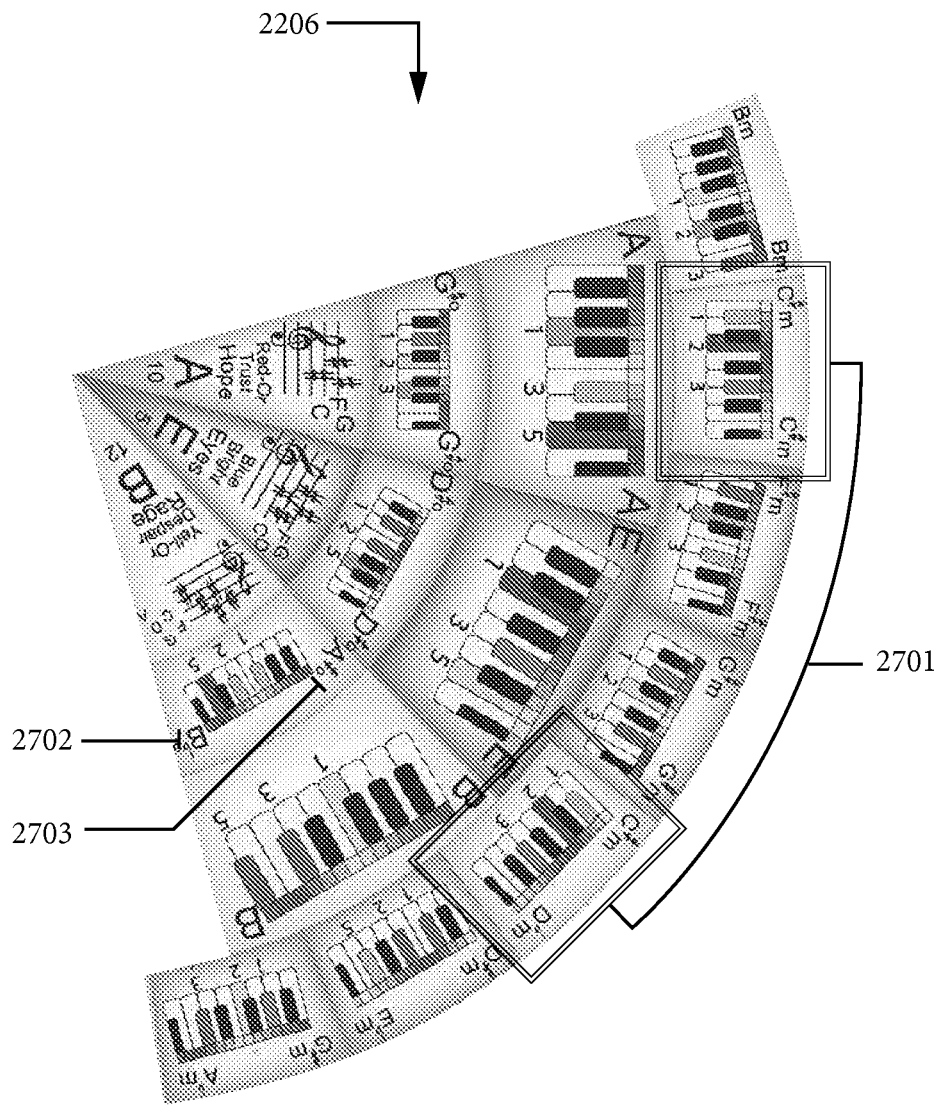
FIG. 27: Repeating Minor Chords

FIG. 27: Repeating Minor Chords

Figure 28:
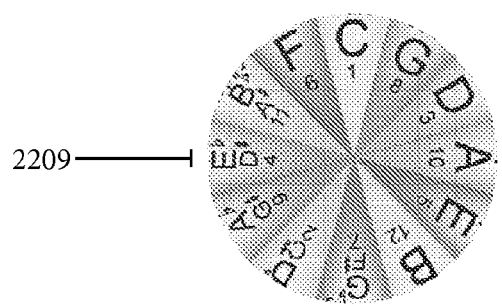
FIG. 28: Key and Chromatic Scale Numbers

FIG. 28: Key and Chromatic Scale Numbers

Figure 29:
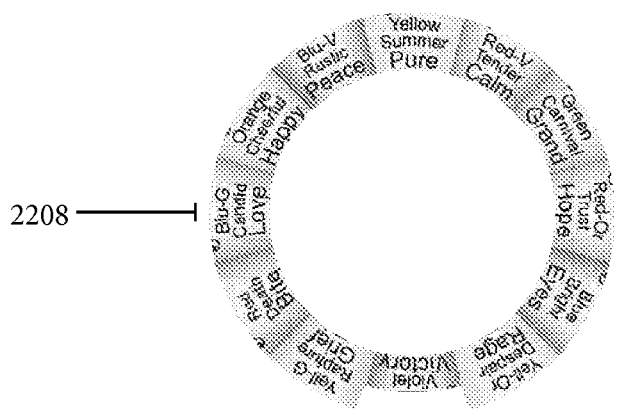
FIG. 29: Color and Character

FIG. 29: Color and Character

Figure 30:
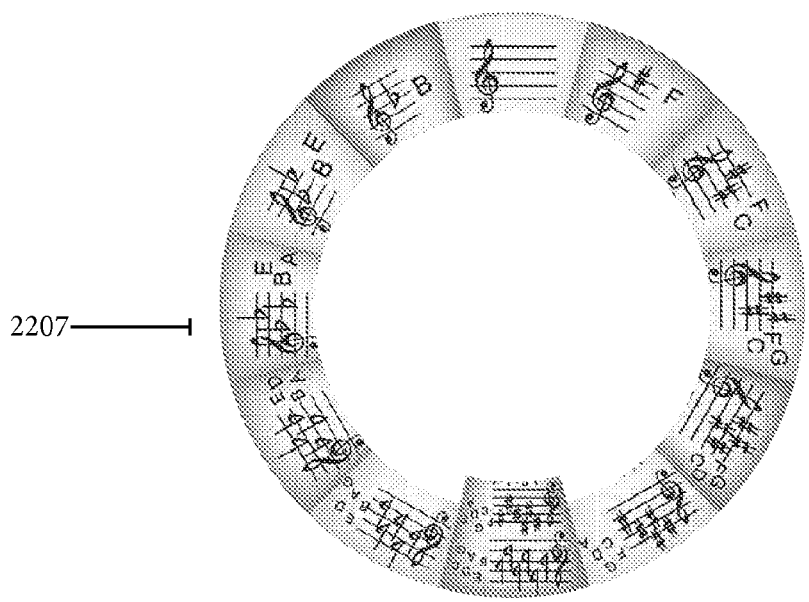
FIG. 30: Key Signature

FIG. 30: Key Signature

Figure 39:
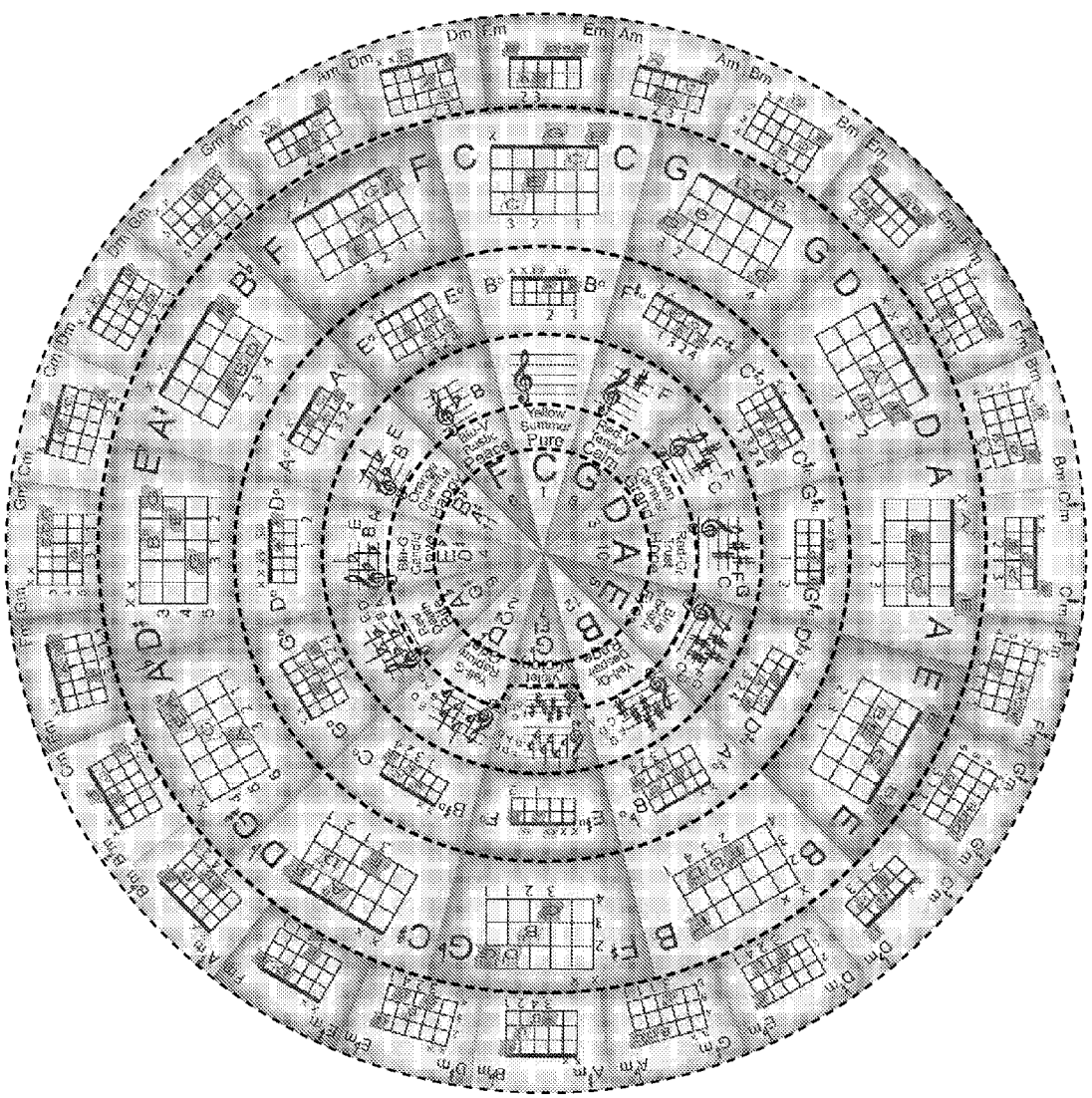
FIG. 39: Guitar Wormhole, Back Page Front Side (dashed lines divide diagram)

FIG. 39 identifies a circular disc of chord information for the Guitar Wormhole. There is a consistent methodology across FIG. 22 and FIG. 39 which allows the Wormhole product to offer education and entertainment across multiple musical instruments FIG. 23 shows the "ice-cream cone" shaped information which when the circular disc of chord information is properly positioned, shows all the chords of one of the twelve keys of the Major Scale. FIG. 23 shows the key of "C" and the "C" chord is shown in the center position identified by element 2305 (or the "I" position as identified by element 1104 in FIG. 11).

FIG. 23 shows the scale degrees "vii, I, iii" in a vertical column with scales degrees "ii" and "IV" on the left hand side and scale degrees "V" and "vi" on the right hand side.

Element 2309 identifies the minor band of chords. Element 2303 identifies the musical instrument image within the chord segment as the Piano keyboard showing one octave (including the repeated first degree at the end of the octave plus half of the Db/C# key). The octave is shown as black and white keys, with a color overlay to identifies the keys which need to be played in order to generate the sound of the chord identified and a strip of colored squares across the top of the keyboard to identify all twelve notes of the chromatic scale and their assigned keyboard keys. The order of the black and white keys identified in element 2303 is a group of two blacks followed by a group of three black keys.

Element 2302 shows the grouping of a group of two black keys followed by a group of three black keys to complete the octave (approximately). Element 2301 show a grouping of three black keys followed by a group of two black keys to complete the octave (approximately). These two variations are the only two that are used in the Wormhole's disc of chord information.

Element 2305 identifies the C major chord which has the color of Yellow (see FIG. 33 for more detail on color allocation). All of the segments within the circular disc of chords are colored according to the color assigned to the root note of the chord.

Element 2306 identifies a strip of colored squares running across the top of the Piano keyboard which spans one octave with the F and one half of the F#/Gb keys repeated. Each of the colored squares represents one note of the twelve notes of the chromatic scale. Colors have been assigned to notes according to a methodology shown in FIG. 33. This strip of colored squares repeats that methodology by locating the colored square over the associated keyboard key.

Element 2304 identifies the Piano keyboard with the Piano keyboard keys of G, B, D colored with the color of the chromatic scale assigned to the notes G, B, D and giving the visual representation that these keys are depressed on the Piano keyboard and generating the sound of the chord shown with colored keys. Similarly all the other chord diagrams on the disc of chord information show colored keys to represent those keys depressed in order to generate the sound of the chord shown by the colored keyboard keys.

Element 2307 identifies the B diminished chord on the Piano keyboard and shows the finger numbers that are recommended for the playing of this chord below each key which is shown in color. The recommended finger number is shown on all the chord diagrams on the disc of chord information.

The finger numbers shown below the keyboard keys shown in color in the chord diagrams is correlated to the finger number shown in FIG. 14 which shows the back of a human right hand with the thumb number one, the index finger number two, the middle finger number three, the ring forger numbered four and the pinky numbered five.

Element 2308 identifies the band on the circular disc of chord information that contains all of the Major chords in all of the keys of the Major Scale (also see FIG. 24).

FIG. 23 displays the "C Major chord" which is constructed with a triad of notes, namely C, E, and G with "C" as the root note (see element 2305 which shows the three notes C,E,G on the Piano keyboard). The chord to the right of the "C Major chord" is determined by moving the root note up by an interval of seven half steps, which is the note of "G". Constructing a Major triad with G as the root, produces the triad G, B, D (see element 2304 which shows the three notes G, B, D on the Piano keyboard). Moving up an interval of seven half steps from the root note of "G", identifies the note of "D" which produces the Major triad D, F#, A. The order of the Major triads in the Major band is set in this manner. By continuing to move the root note up by an interval of seven half steps, the twelve major triads for each of the twelve notes of the chromatic scale are produced in the following sequence; C, G, D, A, E, B, Gb, Db, Ab, Eb, Bb, and F (see FIG. 24).

Each of these major chords is used three times when all twelve keys of the Major Scale are played. The "first time" the major chord is used is as the "I" chord of the Major Scale. FIG. 23 shows the "C Major Chord" as the first degree of the "C Major Scale". The "second time" that the "C Major Chord" is used is as the "IV" chord of the "G Major Scale" and the "third time" the "C Major Scale" is used is as the "V" chord of the "F Major Scale".

As each of the twelve major chords is played three times, a total of thirty six major chords are played when all twelve keys of the Major Scale are played.

Element 2307 identifies the diminished chord in the C Major Scale. There is only one diminished chord in each major scale and it is found by an interval of one half step down from the root note of the major chord which is the first degree of the scale (see FIG. 9 element 904). In the "C major scale", "C" is the first degree of the scale. The root note of the "C major chord" is "C". One half step down from "C" is "B" identifying the diminished chord of B, D, F with a interval of three half steps between each note (see FIG. 35). The twelve major triads for each of the twelve notes of the chromatic scale (shown in FIG. 24) determine their corresponding diminished chord in this manner. The twelve diminished chords for the twelve keys of the Major Scale are shown in FIG. 25.

FIG. 26 identifies the minor band of chords where twenty four chords are displayed.

FIG. 23 identifies that two minor chord segments occupy that same area and dimensions as would naturally be projected outward from one Major band segment if the radius lines that make up the outer edges of the major band segments where extended outwards from the apex of the circle beyond the major band. This configuration results in a circular arrangement of a twelve point circle (same as a clock face) with a twenty four point outer ring which, in this product, is offset by a half segment.

Element 2309 identifies the band of minor chords with the third degree of the Major Scale "iii" positioned directly above the first degree of the Major Scale "I". With the circular dynamics stated in the paragraph above, two segments are available for the two remaining minor chords found in each Major Scale. Placement of the "ii" chord on the left side of the centered "iii" chord and the "iv" chord on the right side of the centered "iii" chord allows the pattern to repeat for all the keys of the Major Scale.

FIG. 26 show the minor chord band where each note of the chromatic scale is shown as the root of a minor triad twice but played three times, once as the third degree of the Major Scale "iii", once as the sixth degree of the Major Scale "vi" and once as the second degree of the Major Scale "ii", when all twelve keys of the Major Scale are played. Elements 2601 and 2602 identify repeating minor chords.

FIG. 27 identifies the "I, ii, iii, vi, vii" chords in the key of "A, E and B" with element 2701 identifying the "C#m" chord as part of the Major Scale in all three keys. In the Key of "A", the "C#m" chord is the third degree of the Major Scale "iii" and in the key of "E", the "C#m" chord is the sixth degree of the Major Scale "vi" and in the key of "B", the "C#m" chord is the second degree of the Major Scale "ii".

The order of the minor chords on the minor chord band shown on FIG. 26 is determined by the first chord of each Major Scale "I" and taking four half steps up the chromatic scale to the minor chord which is the third degree of the Major Scale "iii". Move to the next key in a clockwise direction and the chord that was the third degree of the Major Scale "iii" in the first key is the sixth degree of the Major Scale in the second key "vi". Move to the next key in a clockwise direction and the chord that was the sixth degree of the Major Scale "vi" in the second key is now the second degree of the Major Scale "ii" in the third key. This method determines the positions of all of the minor chords in the band of minor chords. Consequently each note of the chromatic scale is used as a minor chord in three different keys, once in each of the three possible scale degree positions that a minor chord can be found, namely "ii, iii, and vi".

If all twelve keys of the Major Scale are played, minor chord triads will be played thirty six times, major chord triads will be played thirty six times and diminished chord triads will be played twelve times making a total of eighty four chords for the twelve keys of the Major Scale.

Element 2702 and 2703 identifies the diminished chord for the key of B. The chord name is shown in the right and left hand side of the segment that the chord occupies. Where an enharmonic name exists for that chord, the sharp version of the name is shown on the right hand side, viewed from the center point of the disc (element 2703), and the flat version of the enharmonic name is shown on the left hand side, viewed from the center point of the disc (element 2702). A similar methodology is applied to the other chords with enharmonic names.

FIG. 28 shows the inner most circle of information identified in FIG. 22. The name of the key is the same as the name of the first degree of the Major Scale or the "I" chord.

The names of the keys with their corresponding chromatic scale number are shown below in Table 2:

TABLE 2

TABLE-US-00002 C 1 G 8 D 3 A 10 E 5 B 12 Gb/F# 7 Db/C# 2 Ab/G# 9 Eb/D# 4 Bb/A# 11 F 6

Only the five black keys have their enharmonic names shown. The five black keys have their flat name shown first.

FIG. 29 shows a band of color and character information for each key. The color assign to each key is discussed in detail in the narrative accompanying FIG. 33. The character of each key is the inventor's personal opinion on the sound characteristics of that key. These character assignments are intended as suggestions and a starting point for a conversation on the subject. The color and character assigned to each key are shown below in Table 3:

TABLE 3

TABLE-US-00003 Key Color Character 1 Character 2 C Yellow Pure Summer G Red_V Calm Tender D Green Grand Carnival A Red_Or Hope Trust E Blue Eyes Bright B Yell-Or Rage Despair Gb/F# Violet Victory Db/C# Yell-G Grief Rapture Ab/G# Red Bite Death Eb/D# Blu-G Love Candid Bb/A# Orange Happy Cheerful F Blu-V Peace Rustic FIG. 30 identifies the key signature assigned to each of the twelve keys of the Major Scale. The key of "C" has no sharps or flats in its key signature. Moving clockwise, each key gains one sharp until the key of GbIF# which has an enharmonic key signature of six sharps or six flats. Moving anti-clockwise from the key of "C" which has no sharps or flats, each key gains one flat until the key of Gb/F# which has an enharmonic key signature of six flats or six sharps.

The order that sharped notes are added is F, C, G, D, A and E.

The order that flats are added is B, E, A, D, G and C.

Enharmonic key signatures of seven sharps and five flats exist for the key of Db/C# and the key of "B" has an enharmonic key signature of seven flats and five sharps but these enharmonic key signatures are not shown here in order to maximize the use of space and keep simplicity.

The key signature identifies the key and tells the player which notes to sharp or flat. In the key of "D", the key signature has two sharps, "F and C". Whenever the note F or C are played within this key, whether the note is the root, third or fifth of a triad, the notes must be "sharped" to be correct (unless the composer deliberately indicates otherwise with the use of an accidental).

Figure 31:
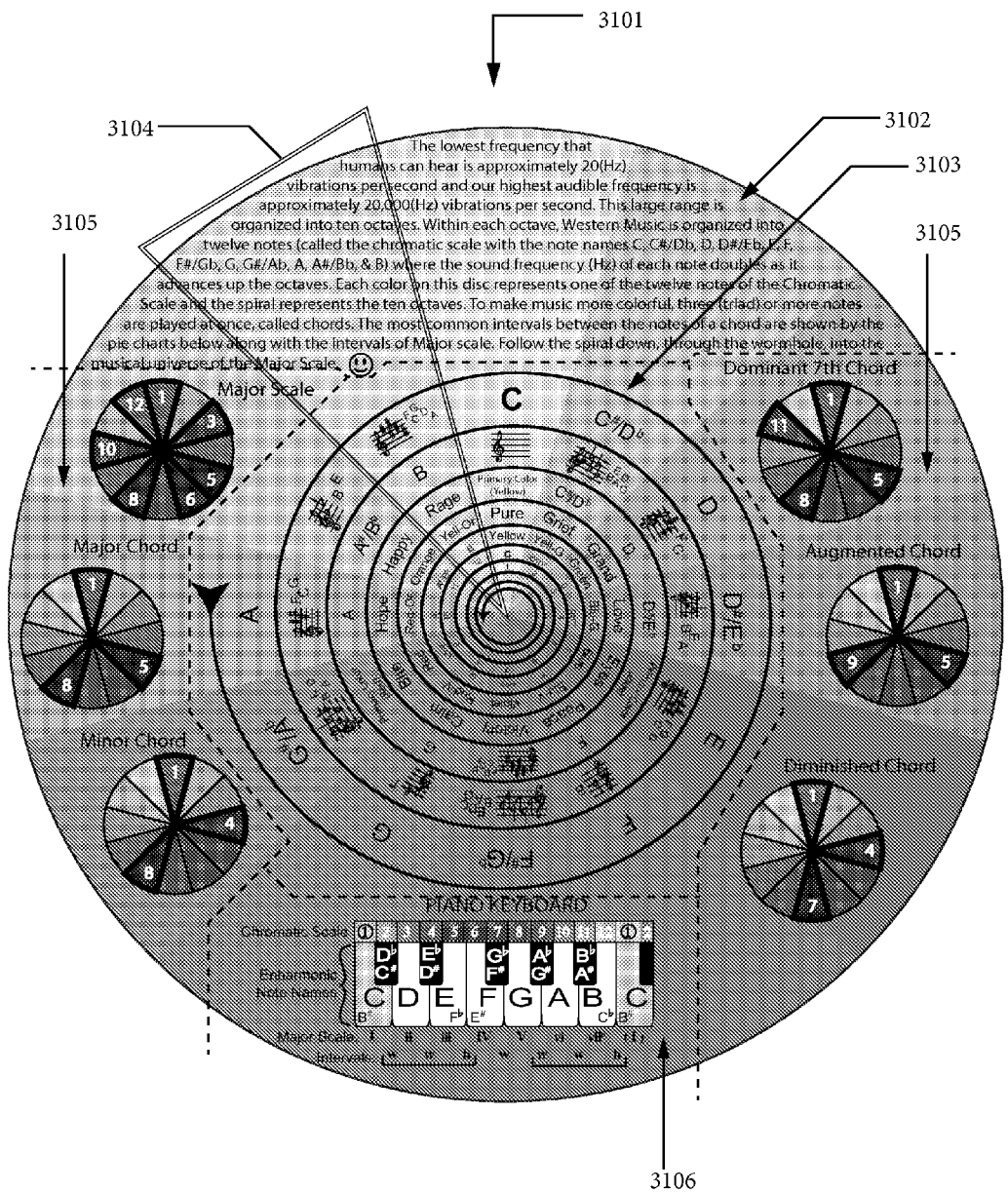
FIG. 31: Piano Wormhole, Back Page Back Side (dashed lines divide diagram)

FIG. 31 shows the back side, back page of the Piano Wormhole. This figure is broken out with dashed lines into multiple drawings namely:

FIG. 32: Audible Range Instructional Text
    FIG. 33: Octave Spiral with Chromatic Scale and Colors
    FIG. 34: Chromatic Scale Segment
    FIG. 35: Interval Pie Charts showing Major, Minor, Diminished, Aug. and Dom.Chords
    FIG. 36: Piano Keyboard showing enharmonic note names
    FIG. 40, element 4001 identifies the back side, back page of the Guitar Wormhole with dashed lines to facilitate the recognition of the similarity of the back side, back page of the Wormhole product across multiple musical instruments.

FIG. 32 provides educational text on the subject matter of human audible range, chromatic scale notes, note frequency doubling as it advances up the ten octaves, triad chords and their intervals between notes.

Element 3201 identifies the text below:

"The lowest frequency that humans can hear is approximately 20 (Hz) vibrations per second and our highest audible frequency is approximately 20,000 (Hz) vibrations per second. This large range is organized into ten octaves. Within each octave, Western Music is organized into twelve notes (called the chromatic scale with the note names C, C#/Db, D, D#/Eb, E, F, F#/Gb, G, G#/Ab, A, A#/Bb, & B) where the sound frequency (Hz) of each note doubles as it advances up the octaves. Each color on this disc represents one of the twelve notes of the Chromatic Scale and the spiral represents the ten octaves. To make music more colorful, three (triad) or more notes are played at once, called chords. The most common intervals between the notes of a chord are shown by the pie charts below along with the intervals of Major scale. Follow the spiral down, through the wormhole, into the musical universe of the Major Scale."

Element 3202 identifies a "smiley face" image to compliment the whimsical last line of the text.

FIG. 33 identifies the octave spiral drawing with each of the twelve notes of the chromatic scale shown in a separate color segment. Each color segment is the domain of only one note of the chromatic scale. Twelve color segments exist, as there are twelve notes in the chromatic scale.

Element 3301 identifies the number one at the top of the circle around the spiral drawing. The number one is assigned to the key of "C" and is assigned the primary color Yellow. This chromatic scale number and the color of Yellow is always used in association with the note of "C". Similarly the other eleven notes of the chromatic scale are assigned a permanent chromatic scale number and a permanent color. The chromatic scale numbers start at one at the top of the circle and move clockwise from one to twelve.

Colors are assigned to the notes of the chromatic scale by assigning the middle color of the visible spectrum; Yellow, to the note which is commonly referred to as "Middle C" and is approximately in the middle of the audible spectrum. Yellow is a primary color.

The key of "E" is assigned the primary color Blue and the key of "G#/Ab" is assigned the color of Red. There is an interval of four half steps between each primary color.

Primary colors cannot be created by mixing any other colors together. Secondary colors are created by mixing two primary colors together. Tertiary colors are created by mixing one primary color and one secondary color together.

With the primary colors equally spaced around the twelve point circle, the secondary colors are added to the segment which is the mid-point between each pair of primary color. Secondary colors Green, Violet and Orange are assigned to the notes of "D, F#/Gb, A#/Bb" respectively.

Tertiary colors are assigned to the remaining six segments of the circle. Tertiary colors are a mix of the one primary and one secondary color. The name of this color is proprietary to the Wormhole product. The tertiary color names are hyphenated, with the first part of the hyphenated name reflecting the primary color and the second part of the hyphenated name reflecting the secondary color.

The color names and their corresponding notes of the chromatic scale are shown in Table 4 below:

TABLE 4

Figure 34:
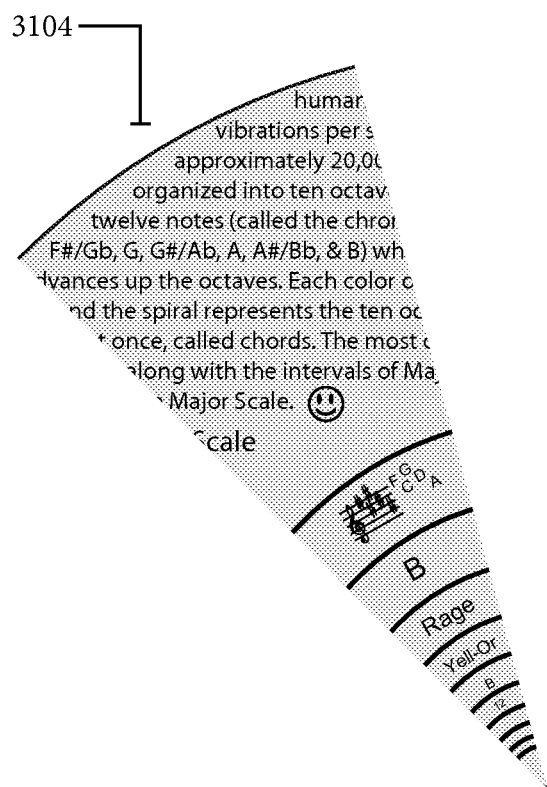
FIG. 34: Chromatic Scale Segment

TABLE-US-00004 Chromatic Scale Note Name Note Color 1 C Yellow 2 C#/Db Yell-G 3 D Green 4 D#/Eb Blue-G 5 E Blue 6 F Blue-V 7 F#/Gb Violet 8 G Red-V 9 G#/Ab Red 10 A Red-Or 11 A#/Bb Orange 12 B Yell-Or FIG. 34 identifies the segment of the spiral which is the domain of the key of "B". The key signature, chromatic scale note name, key character, note color and chromatic scale number are shown in the "layers" of the spiral drawing.

A similar segment exists for all the other keys of the Major scale, with each segment showing similar information that is relevant to that particular key.

Figure 35:
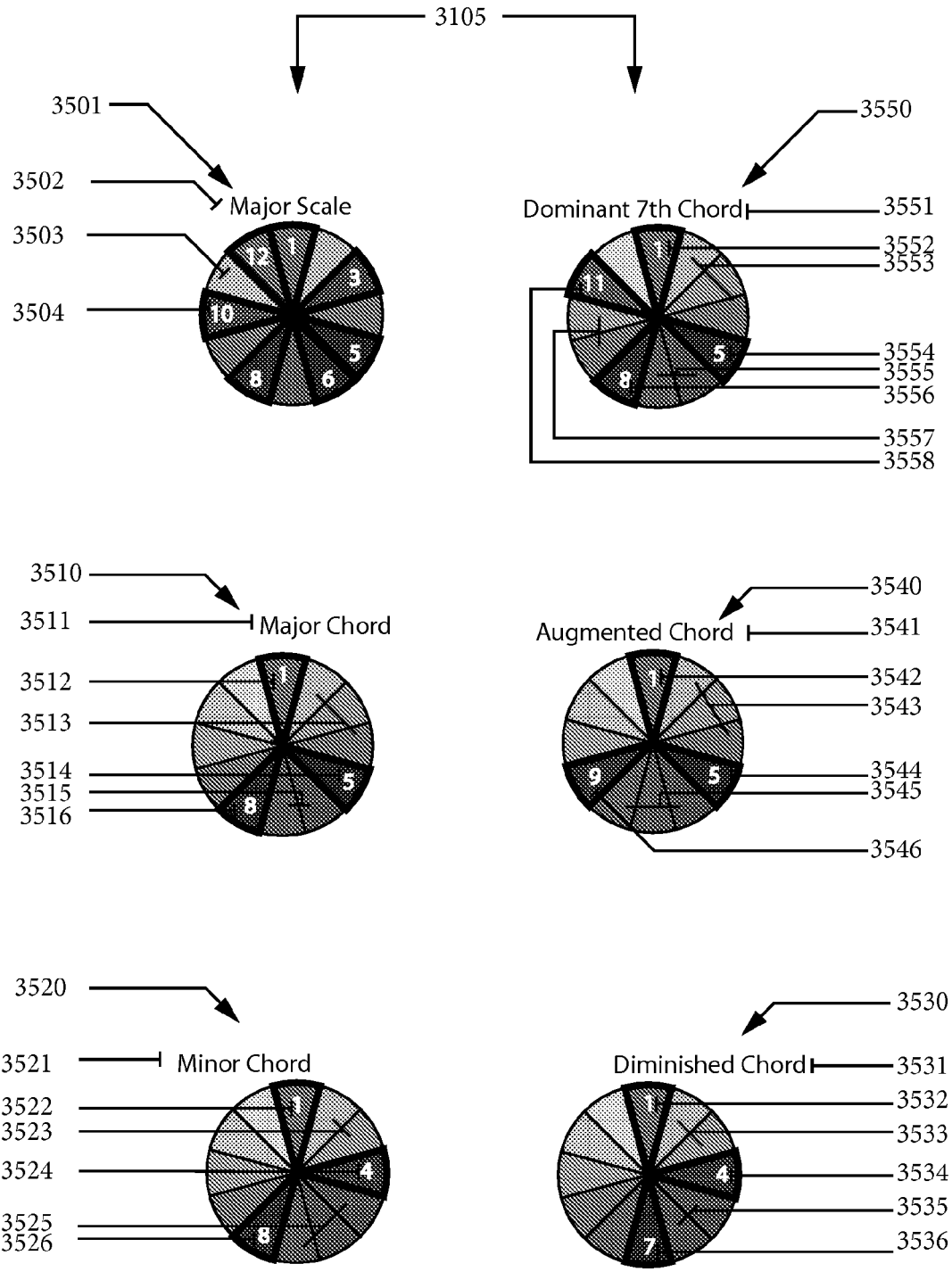
FIG. 35: Interval Pie Charts showing Major Scale and Chords
Figure 36:
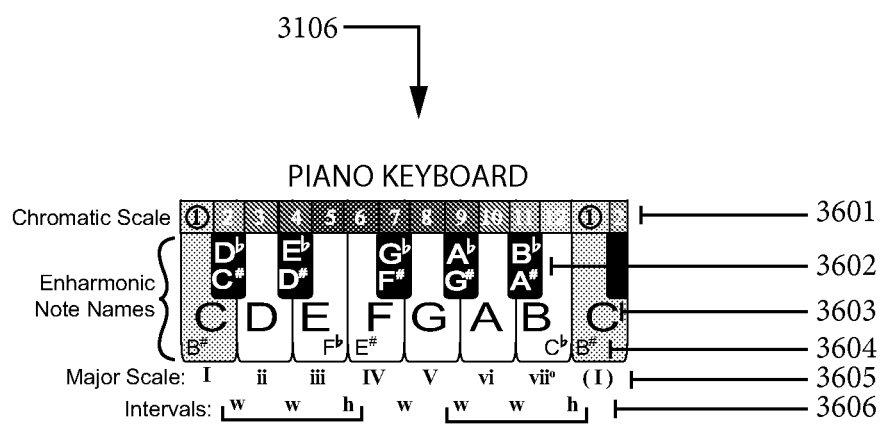
FIG. 36: Piano Keyboard showing enharmonic note names

FIG. 35 shows six pie charts, each identifying a musical interval.

The segments of the pie chart are colored using the methodology identified in FIG. 33. Gray scaling with a black boarder and a white chromatic scale number is used to identify the segments of the pie chart which are used in the spelling of a chord or the degrees of the Major Scale.

Element 3502 identifies the title of drawing 3501 as the Major Scale. This pie chart has twelve segments (slices), one for each of the notes of the chromatic scale. The segments of the pie chart are colored using the methodology identified in FIG. 33. Gray scaling with a black border and a white chromatic scale number is used for each pie chart segment that forms part of the Major Scale as shown by element 3504. The Major Scale uses the first, third, fifth, sixth, eighth, tenth and twelfth degree of the chromatic scale in order to obtain the seven notes of the Major Scale.

This sequence of intervals is also identified by element 904 in FIG. 9.

The colored pie chart presentation allows the player a visual representation of the interval pattern of the Major Scale. Segments of the chromatic scale pie chart that are not used in the Major Scale are colored with their assigned chromatic scale color as shown by element 3503.

Any of the twelve notes of the chromatic scale can be the first note with the other six notes of the Major Scale following the sequence of intervals described above.

Element 3510 shows a pie chart representation of the Major Chord with element 3511 identifying the title "Major Chord". A major chord is constructed with a root note shown as element 3512, an interval of four half steps shown by element 3513, a second note identified by element 3514, an interval of three half steps identified by element 3515 and a third note identified by element 3516. Any of the twelve notes of the chromatic scale can be the first note with the other two notes following the interval pattern described above.

Element 3520 shows a pie chart representation of the Minor Chord with element 3521 identifying the title "Minor Chord". A minor chord is constructed with a root note shown as element 3522, an interval of three half steps shown by element 3523, a second note identified by element 3524, an interval of four half steps identified by element 3525 and a third note identified by element 3526. Any of the twelve notes of the chromatic scale can be the first note with the other two notes following the interval pattern described above.

Element 3530 shows a pie chart representation of the Diminished Chord with element 3531 identifying the title "Diminished Chord". A diminished chord is constructed with a root note shown as element 3532, an interval of three half steps shown by element 3533, a second note identified by element 3534, an interval of three half steps identified by element 3535 and a third note identified by element 3536.

Any of the twelve notes of the chromatic scale can be the first note with the other two notes following the interval pattern described above.

Element 3540 shows a pie chart representation of the Augmented Chord with element 3541 identifying the title "Augmented Chord". An augmented chord is constructed with a root note shown as element 3542, an interval of four half steps shown by element 3543, a second note identified by element 3544, an interval of four half steps identified by element 3545 and a third note identified by element 3546. Any of the twelve notes of the chromatic scale can be the first note with the other two notes following the interval pattern described above.

Element 3550 shows a pie chart representation of the Dominant 7.sup.th Chord with element 3551 identifying the title "Dominant 7.sup.th Chord". A dominant 7.sup.th chord is constructed with a root note shown as element 3552, an interval of four half steps shown by element 3553, a second note identified by element 3554, an interval of three half steps identified by element 3555, a third note identified by element 3556, an interval of three half steps identified by element 3557 and a fourth note identified by element 3558. Any of the twelve notes of the chromatic scale can be the first note with the other three notes following the interval pattern described above FIG. 36 identifies the Piano keyboard image similar to the Piano keyboard image shown in FIG. 15.

Element 3601 identifies a strip of colored squares, one for each of the twelve notes of the Piano octave. The colors and chromatic scale numbers are assigned according to the methodology discussed in FIG. 33

Element 3602 identifies the enharmonic note names of the black keys.

Element 3603 identifies the note names of the white keys. Some of the white keys have enharmonic names (similar to the black keys) and the enharmonic names of the white keys are shown by element 3604 where applicable.

Element 3605 identifies the degrees of the Major Scale.

Element 3606 identifies the Intervals of the Major Scale.

FIG. 37 shows the Guitar Wormhole's front page, front side with dashed lines dividing the diagram into various parts in a similar way that FIG. 7 does for the Piano Wormhole. This diagram shows a consistent methodology across musical instrument platforms.

FIG. 38 shows the Guitar Wormhole's front page, back side with dashed lines dividing the diagram into various parts in a similar way that FIG. 17 does for the Piano Wormhole. This diagram shows a consistent methodology across musical instrument platforms.

FIG. 39 shows the Guitar Wormhole's back page, front side, with dashed lines dividing the diagram into various parts in a similar way that FIG. 22 does for the Piano Wormhole. This diagram shows a consistent methodology across musical instrument platforms.

Figure 40:
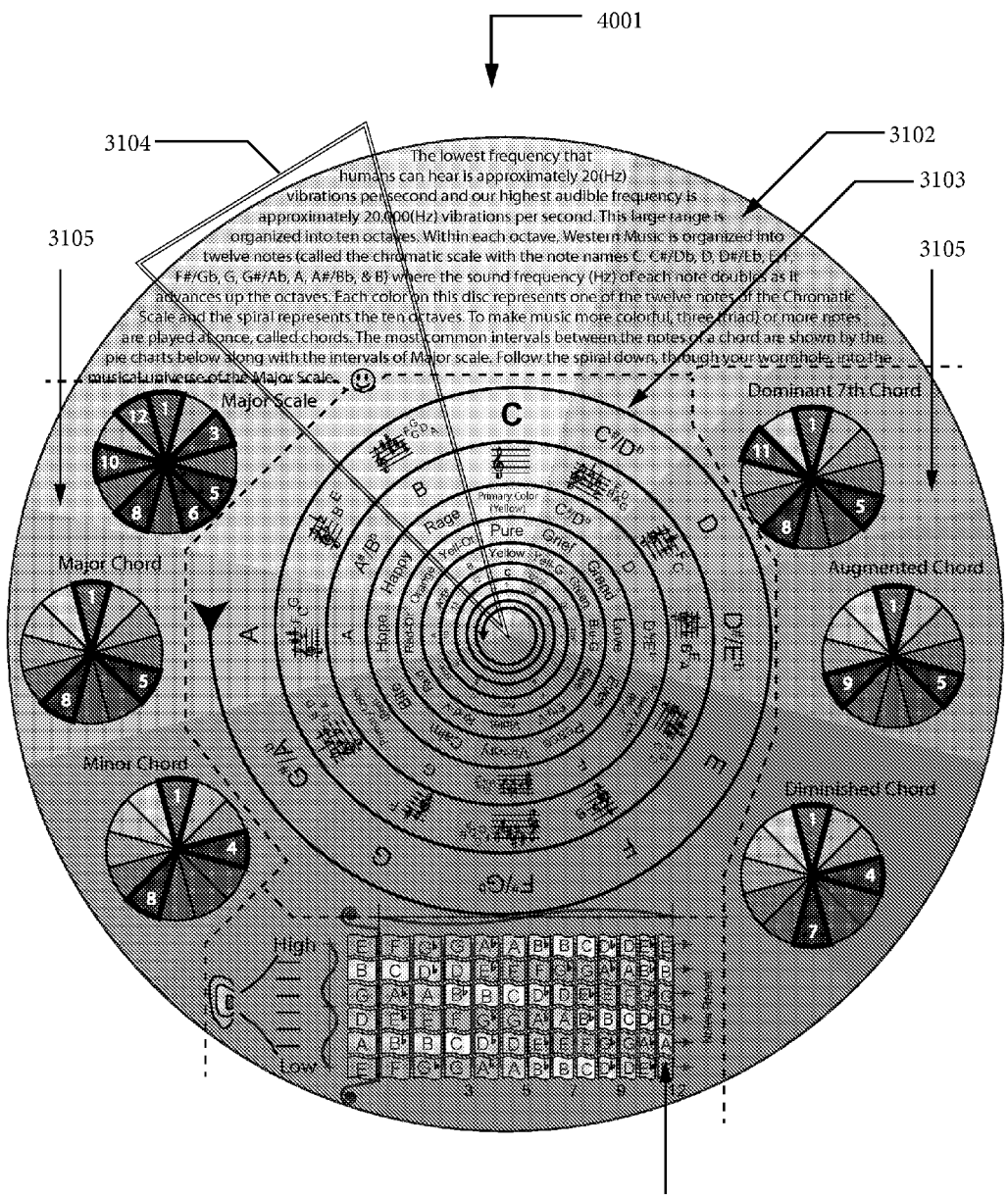
FIG. 40: Guitar Wormhole, Back Page Back Side (dashed lines divide diagram).

FIG. 40 shows the Guitar Wormhole's back page, back side with dashed lines dividing the diagram into various parts in a similar way that FIG. 31 does for the Piano Wormhole. This diagram shows a consistent methodology across musical instrument platforms.

FIG. 40, element 4002 identifies the first twelve frets of a Guitar neck with the notes of the frets/strings identified, two sine waves identifying the octave span and an image of an ear identifying the higher sounding strings from the lower sounding strings.

Figure 41:
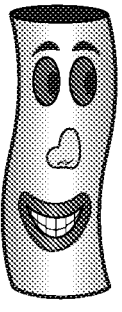
FIG. 41: Ukulele Wormhole, Front Page Front Side.

FIG. 41 shows the Ukulele Wormhole's front page, front side; showing consistent methodology across multiple musical instruments.

FIG. 42 shows the Ukulele Wormhole's front page, back side, showing consistent methodology across multiple musical instruments.

Figure 43:
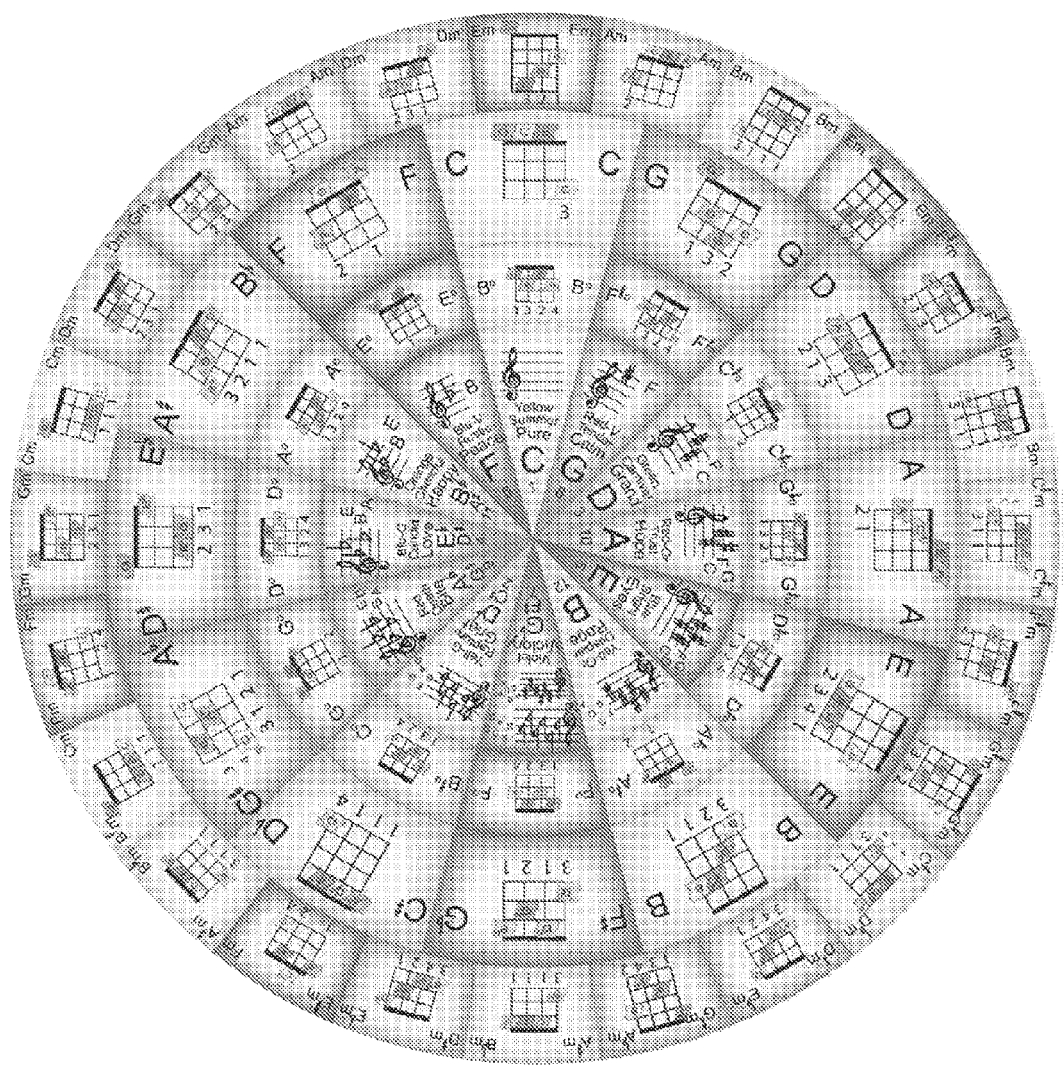
FIG. 43: Ukulele Wormhole, Back Page Front Side.

FIG. 43 shows the Ukulele Wormhole's back page, front side, showing consistent methodology across multiple musical instruments.

Figure 44:
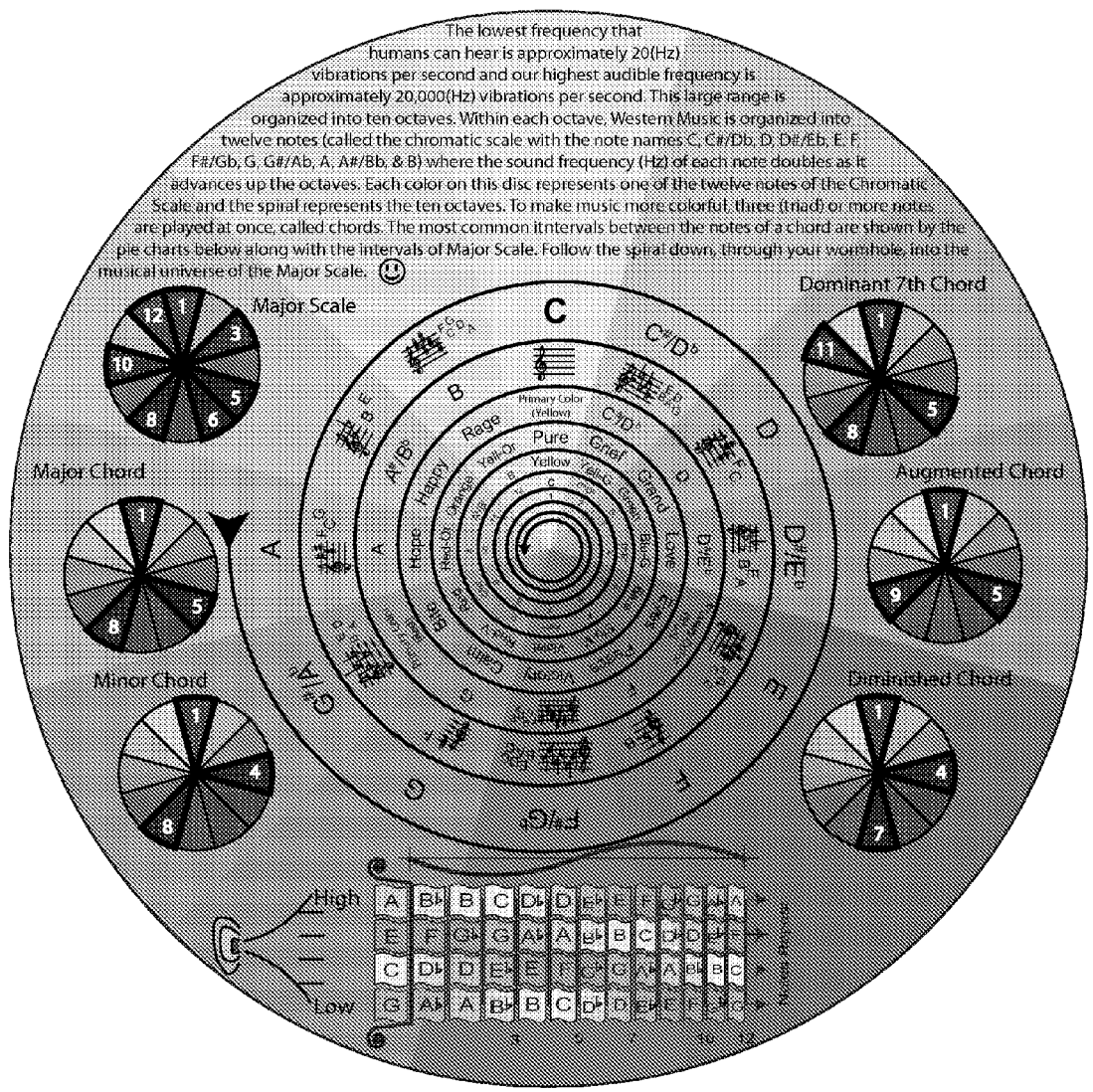
FIG. 44: Ukulele Wormhole, Back Page Back Side.

FIG. 44 shows the Ukulele Wormhole's back page, back side, showing consistent methodology across multiple musical instruments.

Figure 45:
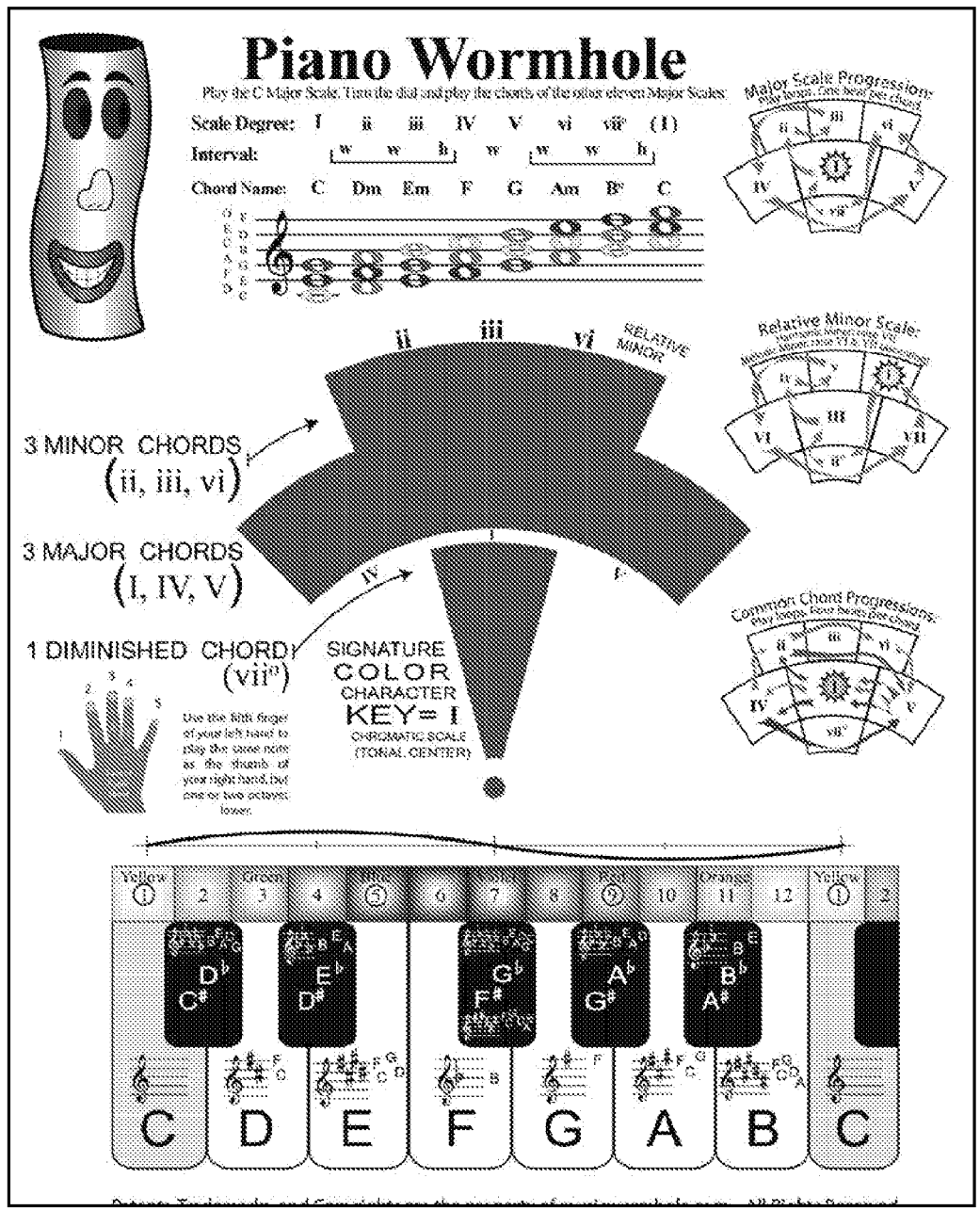
FIG. 45: Piano Wormhole, Front Page, Front Side in Black and White

FIG. 45 shows the Piano Wormhole's front page, front side in "black and white" in order to highlight the differences between a "black and white" Wormhole front page and a color wormhole front page as shown by FIG. 7.

Figure 46:
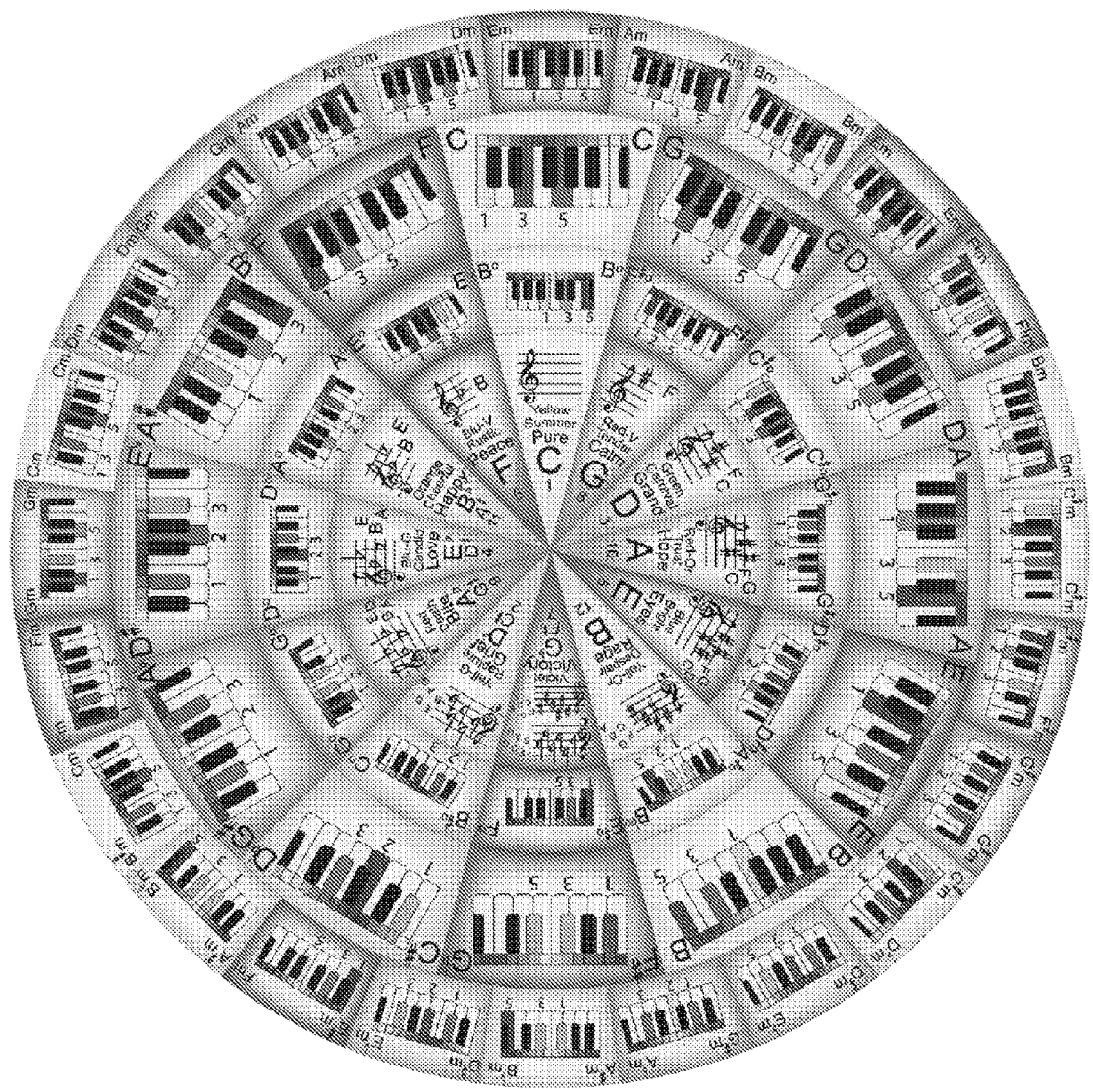
FIG. 46: Piano Wormhole, Back Page, Front Side in Black and White

FIG. 46 shows the Piano Wormhole's back page, front side in "black and white" in order to highlight the differences between a "black and white" Wormhole chord disc and a color wormhole chord disc as shown by FIG. 22.

I claim:

1. A system for displaying finger positions for a specific musical instrument comprising:
    a display illustrating, for a specific musical instrument, and for a musical system having twelve scales, twelve sets of finger position diagrams for the instrument where each set comprises three major chords, three minor chords and one diminished chord;
    wherein the finger position diagrams for the three major chords are arranged in a first partial ring pattern having an outer diameter and an inner diameter and three sized segments, with a center segment displaying a finger position diagram for a major tonic triad with a finger position diagram for an associated sub-dominant triad immediately to one side in the first ring pattern and a finger-position diagram for an associated dominant triad immediately to an opposite side from the finger position diagram for the sub-dominant triad;
    wherein the finger-position diagrams for the diminished chord is arranged concentric within the first partial ring pattern, and below the tonic major chord;
    wherein the finger position diagrams for the three minor chords are arranged in an outer partial ring pattern concentric with the first partial ring pattern, the outer partial ring pattern having three sized segments, with the finger position diagrams for the three minor chords centered on the finger position diagram of the tonic major chord of that scale in the first partial ring pattern;
    and wherein each of the sets are arranged in a circular arrangement,
    wherein a set pattern for a second scale, rotated in the circular arrangement thirty degrees either clockwise or counter-clockwise, illustrates associated diminished, major and minor chords for the second scale, the major and minor chords for the second scale sharing one or more major chords and one or more minor chords from the first scale pattern, and further rotations of the pattern by thirty degrees illustrates each of the associated diminished, major and minor chords in each of the twelve scales.

2. A method for displaying finger positions for a specific musical instrument comprising:
    providing a display illustrating, for a specific musical instrument, and for a musical system having twelve scales, twelve sets of finger position diagrams for the instrument where each set comprises three major chords, three minor chords and one diminished chord;
    wherein the finger position diagrams for the three major chords are arranged in a first partial ring pattern having an outer diameter and an inner diameter and three sized segments, with a center segment displaying a finger position diagram for a major tonic triad with a finger position diagram for an associated sub-dominant triad immediately to one side in the first ring pattern and a finger-position diagram for an associated dominant triad immediately to an opposite side from the finger position diagram for the sub-dominant triad;

wherein the finger-position diagrams for the diminished chord is arranged concentric within the first partial ring pattern, and below the tonic major chord;

wherein the finger position diagrams for the three minor chords are arranged in an outer partial ring pattern concentric with the first partial ring pattern, the outer partial ring pattern having three sized segments, with the finger position diagrams for the three minor chords centered on the finger position diagram of the tonic major chord of that scale in the first partial ring pattern;

and wherein each of the sets are arranged in a circular arrangement, wherein a set pattern for a second scale, rotated in the circular arrangement thirty degrees either clockwise or counter-clockwise, illustrates associated diminished, major and minor chords for the second scale, the major and minor chords for the second scale sharing one or more major chords and one or more minor chords from the first scale pattern, and further rotations of the pattern by thirty degrees illustrates each of the associated diminished, major and minor chords in each of the twelve scales.

* * * * *